United States Patent
Nonaka et al.

(10) Patent No.: US 11,126,514 B2
(45) Date of Patent: Sep. 21, 2021

(54) INFORMATION PROCESSING APPARATUS, INFORMATION PROCESSING SYSTEM, AND RECORDING MEDIUM RECORDING PROGRAM

(71) Applicant: FUJITSU LIMITED, Kawasaki (JP)

(72) Inventors: Takashi Nonaka, Yokohama (JP); Asuka Okagawa, Kawasaki (JP); Akihiro Sugaya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 16/145,247

(22) Filed: Sep. 28, 2018

(65) Prior Publication Data
US 2019/0129816 A1    May 2, 2019

(30) Foreign Application Priority Data

Oct. 31, 2017    (JP) .............................. JP2017-210320

(51) Int. Cl.
     *G06F 11/20*      (2006.01)
     *G06F 3/06*      (2006.01)

(52) U.S. Cl.
     CPC ........ *G06F 11/2094* (2013.01); *G06F 3/0619* (2013.01); *G06F 3/0659* (2013.01);
     (Continued)

(58) Field of Classification Search
     CPC ............. G06F 11/2094; G06F 11/2069; G06F 3/0619; G06F 3/0659; G06F 3/0673; G06F 2201/805; G06F 2201/82
See application file for complete search history.

(56) References Cited

U.S. PATENT DOCUMENTS 5,664,195 A * 9/1997 Chatterji ............... G06F 9/4411
                                                     717/178
5,822,782 A * 10/1998 Humlicek ............. G06F 3/0626
                                                     711/170

(Continued)

FOREIGN PATENT DOCUMENTS

JP      5-158631 A      6/1993
JP      2002-123406      4/2002

(Continued)

OTHER PUBLICATIONS

Japanese Office Action dated Jun. 29, 2021 for corresponding Japanese Patent Application No. 2017-210230, with English Translation, 11 pages.

*Primary Examiner* — Matthew M Kim
*Assistant Examiner* — Matthew N Putaraksa
(74) *Attorney, Agent, or Firm* — Fujitsu Patent Center

(57) ABSTRACT

An information processing apparatus, includes a first nonvolatile storage device, and a processor coupled to the first nonvolatile storage device, wherein the processor is configured to suspend, when receiving a write request of data from an application, a write process for the write request in a case where second writing of the data into a second nonvolatile storage device of a different information processing apparatus fails while first writing of the data into the first nonvolatile storage device succeeds, record, after the write process is suspended, error information indicative of an error of the second writing, resume, after the error information is recorded, the write process and issue a notification of the application of completion of the write process, and isolate, after the notification of the completion of the write process is issued, a region of the second nonvolatile storage device which is used by the application.

14 Claims, 23 Drawing Sheets

(52) U.S. Cl.
CPC ........ *G06F 3/0673* (2013.01); *G06F 11/2069* (2013.01); *G06F 2201/805* (2013.01); *G06F 2201/82* (2013.01)

(56) References Cited

U.S. PATENT DOCUMENTS

| | | | |
|---|---|---|---|
| 9,786,349 B1* | 10/2017 | Calderoni | G11C 11/221 |
| 2002/0194528 A1* | 12/2002 | Hart | G06F 11/1096 714/6.12 |
| 2006/0090051 A1* | 4/2006 | Speier | G06F 13/1663 711/163 |
| 2009/0327803 A1* | 12/2009 | Fukutomi | G06F 11/108 714/6.32 |
| 2010/0079801 A1* | 4/2010 | Tsujimoto | G06Q 10/10 358/1.15 |
| 2010/0138687 A1 | 6/2010 | Noguchi et al. | |
| 2012/0084260 A1* | 4/2012 | Cherkauer | G06F 16/2308 707/648 |
| 2012/0210067 A1* | 8/2012 | Abumi | G06F 11/2082 711/118 |
| 2014/0157065 A1* | 6/2014 | Ong | G11C 29/12 714/718 |
| 2016/0077928 A1* | 3/2016 | Dwivedi | G06F 11/2082 714/19 |
| 2016/0342490 A1* | 11/2016 | Deguchi | G06F 11/2058 |
| 2016/0371009 A1* | 12/2016 | Sato | G06F 11/1469 |
| 2017/0300383 A1* | 10/2017 | Kato | G06F 3/0619 |
| 2019/0102565 A1* | 4/2019 | Boyd | G06F 3/0665 |

FOREIGN PATENT DOCUMENTS

| | | |
|---|---|---|
| JP | 2010-128886 | 6/2010 |
| JP | 2011-253400 A | 12/2011 |

* cited by examiner

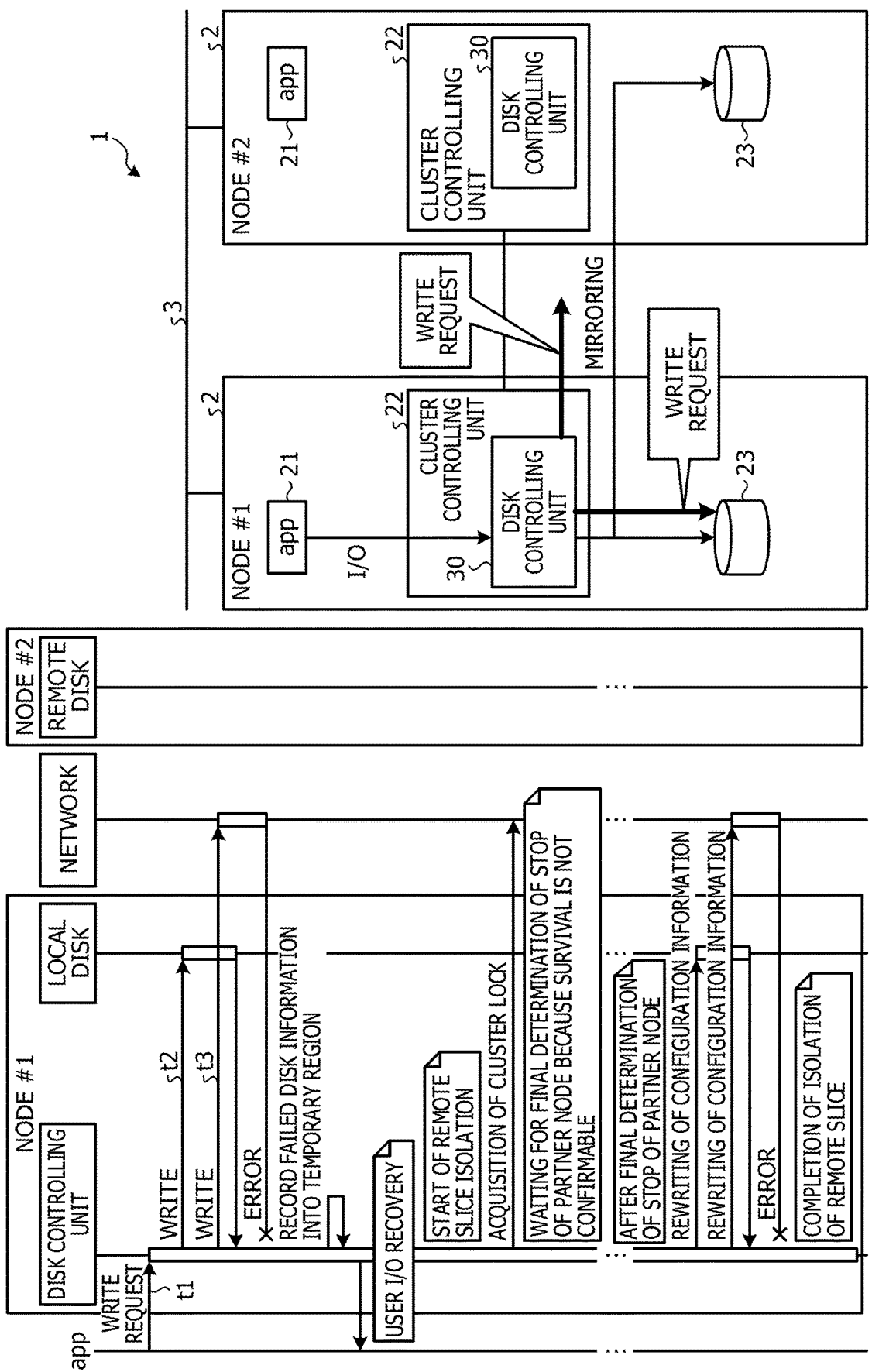

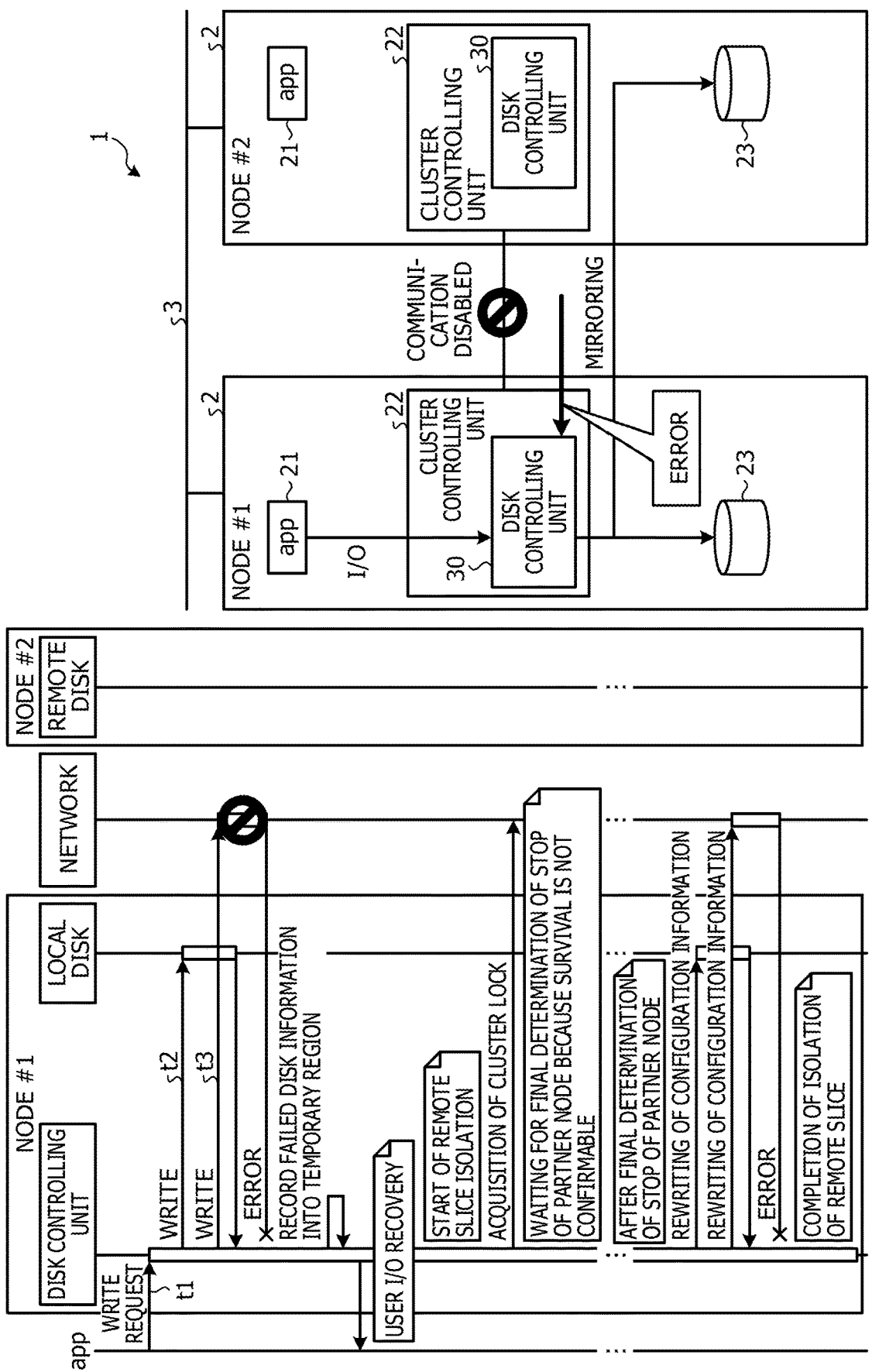

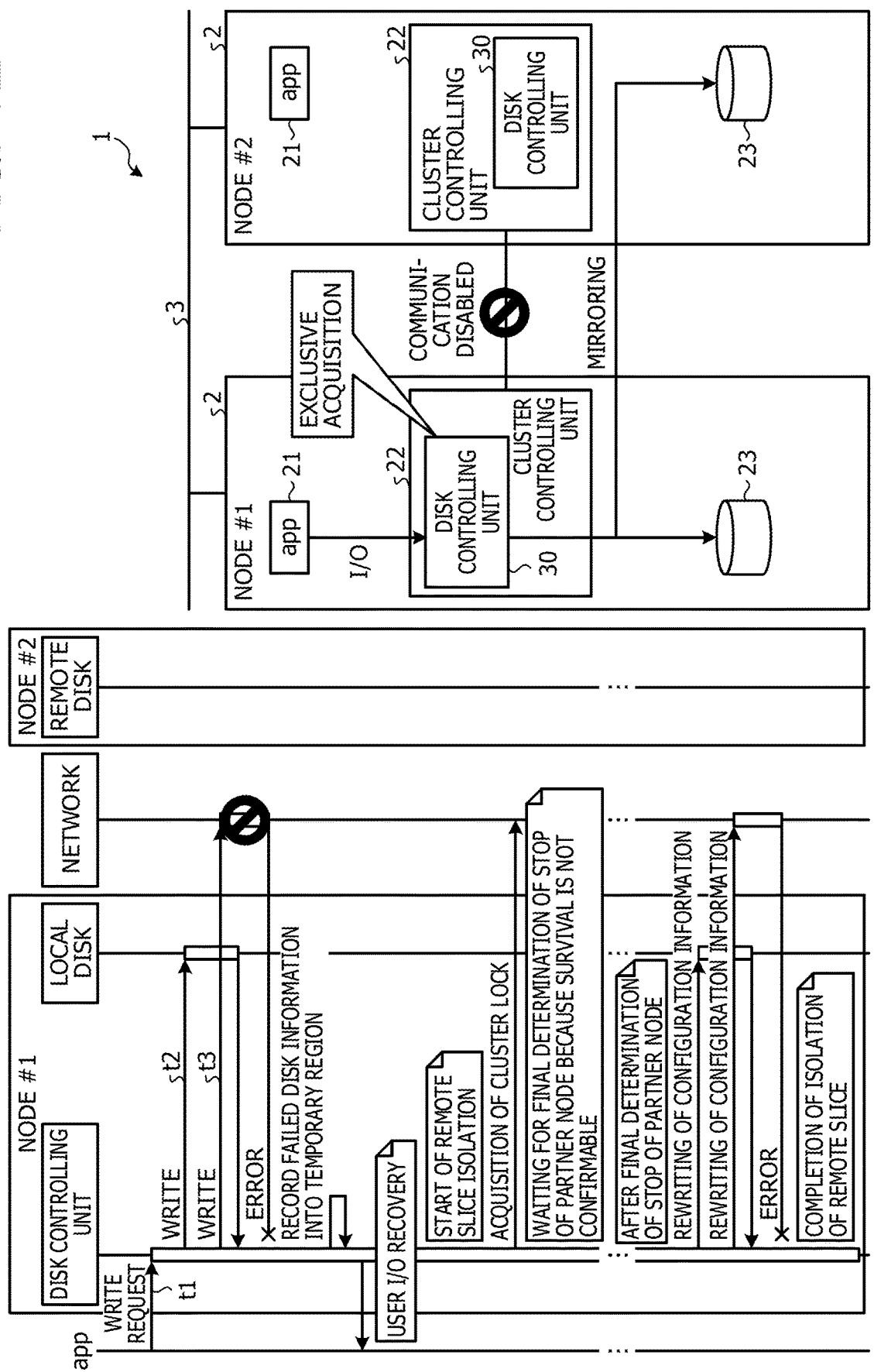

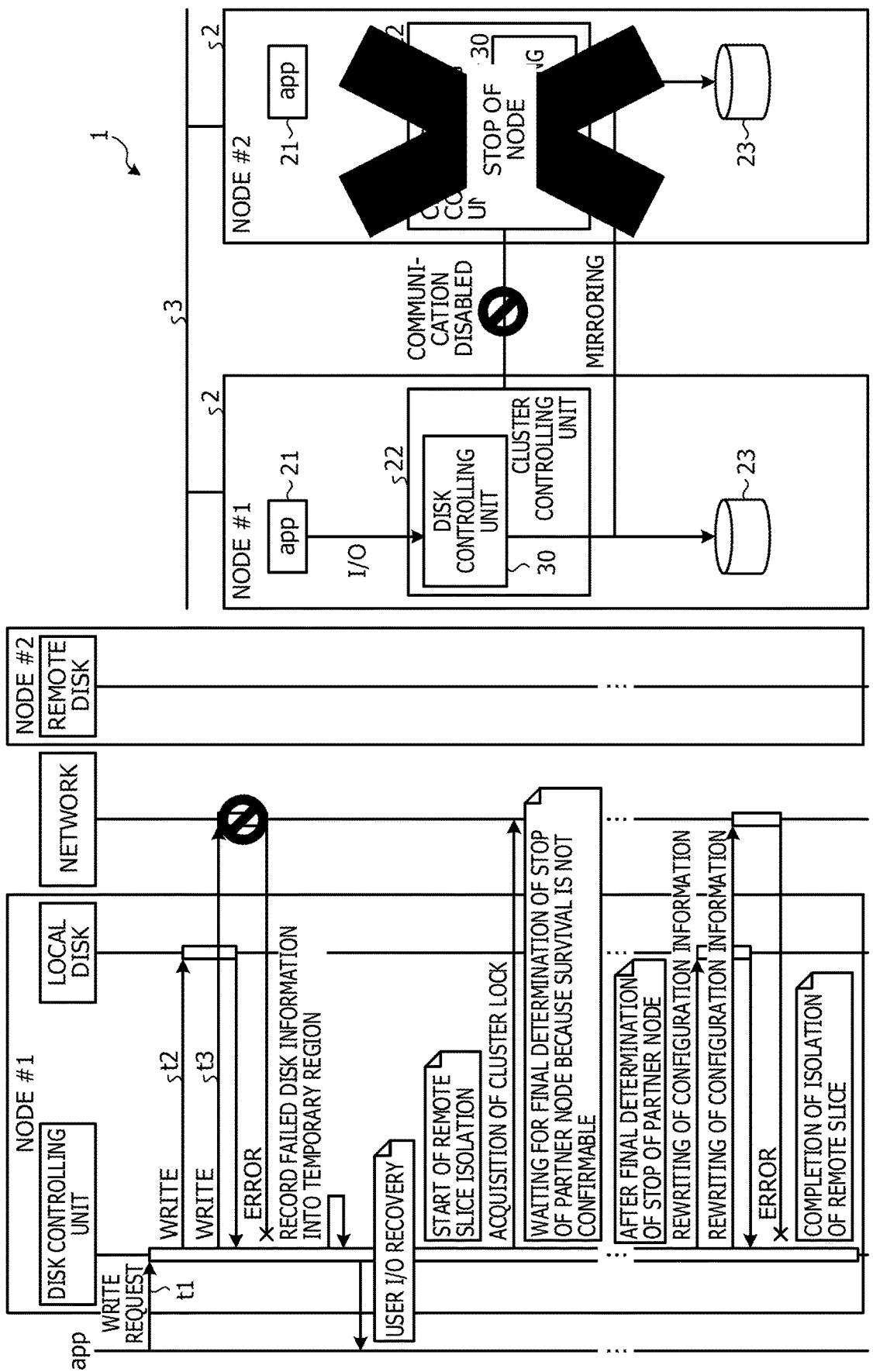

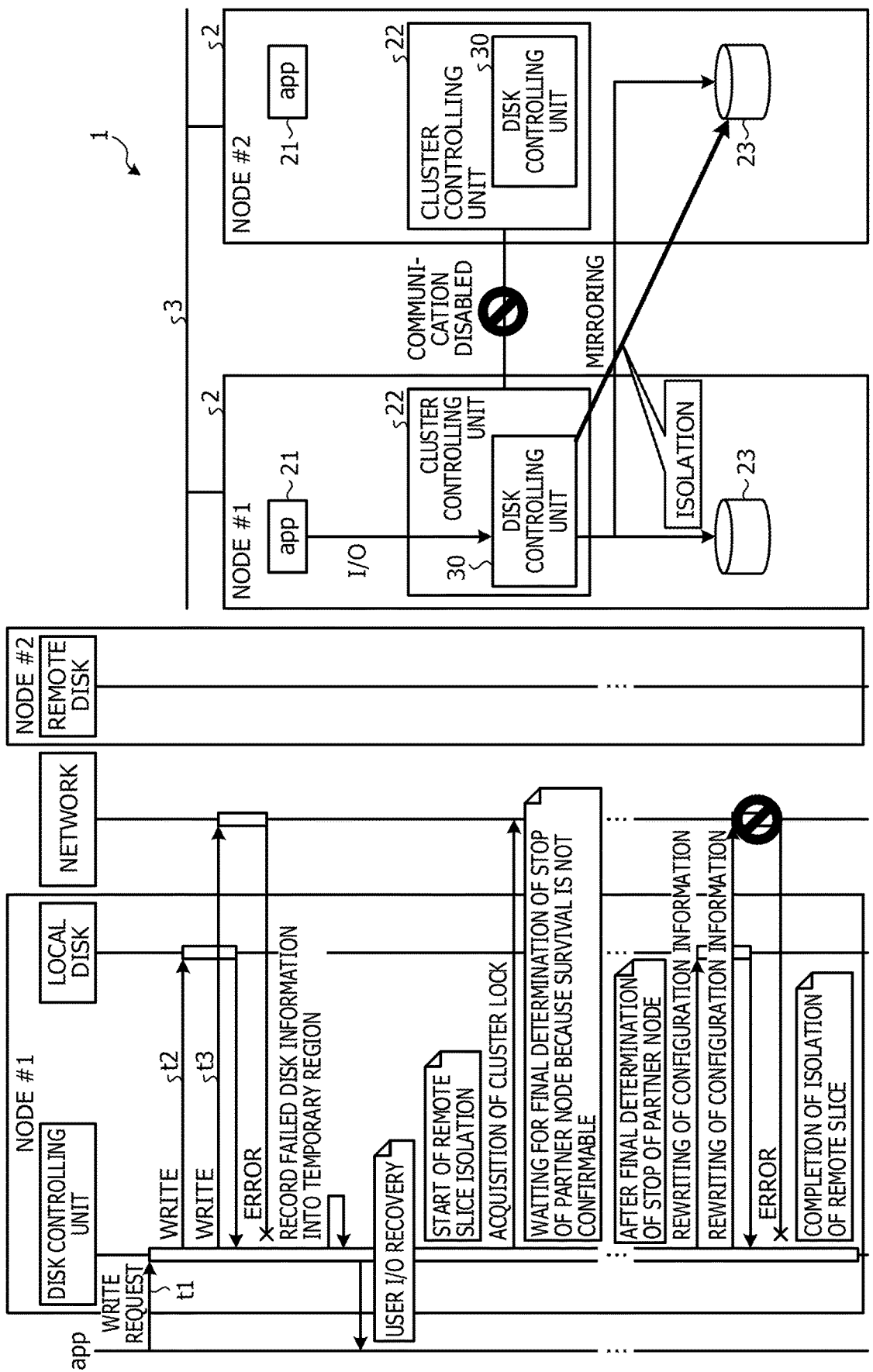

<CLASS ID> <VOLUME ID> <SCSIID>
...

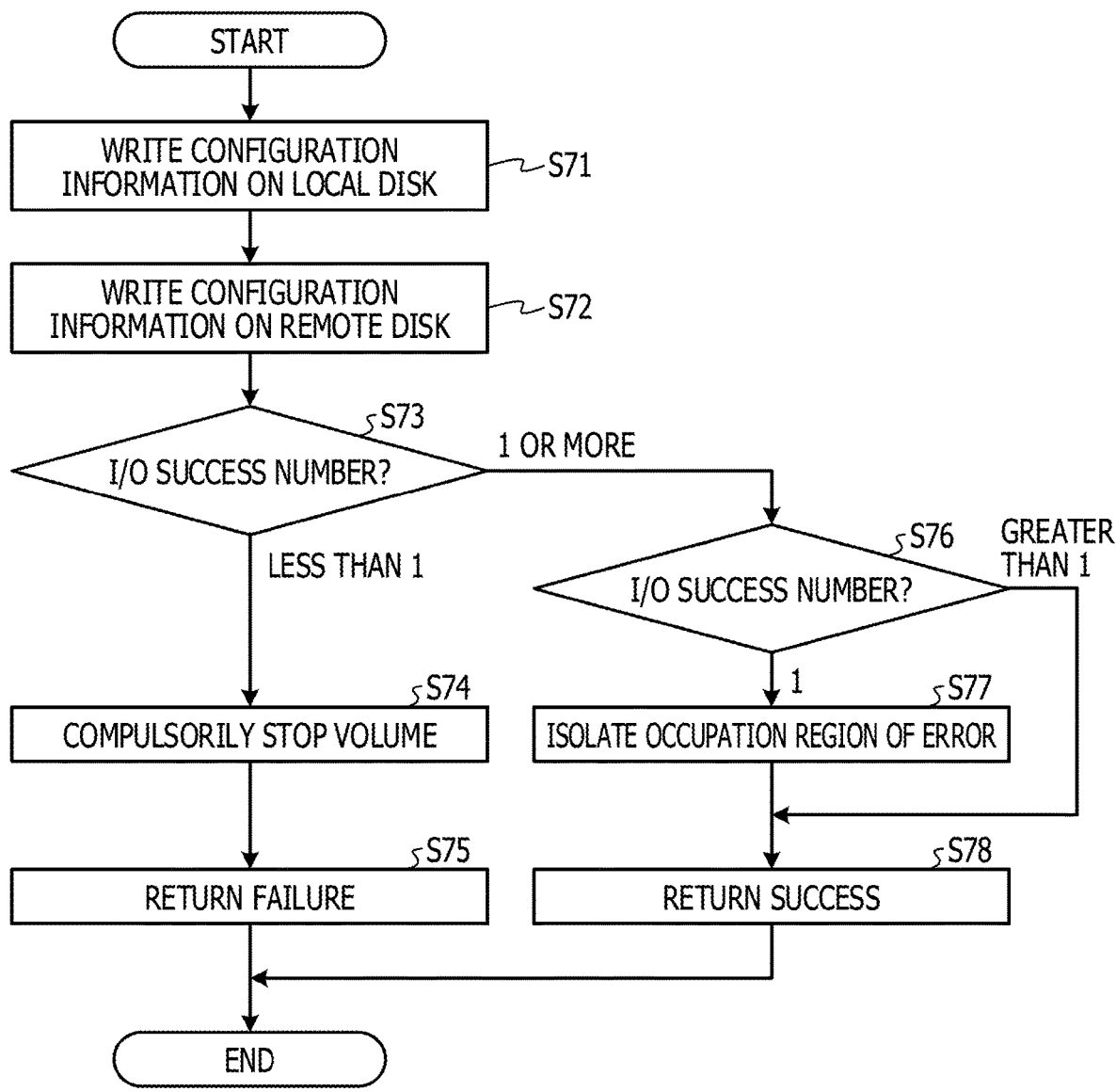

INFORMATION PROCESSING APPARATUS, INFORMATION PROCESSING SYSTEM, AND RECORDING MEDIUM RECORDING PROGRAM

CROSS-REFERENCE TO RELATED APPLICATION

This application is based upon and claims the benefit of priority of the prior Japanese Patent Application No. 2017-210320, filed on Oct. 31, 2017, the entire contents of which are incorporated herein by reference.

FIELD

The embodiment discussed herein relates to an information processing apparatus, an information processing system, and a recording medium on which a program is recorded.

BACKGROUND

In an information processing apparatus, data stored in a local disk apparatus are mirrored to a local disk apparatus of a different information processing apparatus in order to improve the availability of the data.

Examples of the related art include Japanese Laid-open Patent Publication No. 2010-128886 and Japanese Laid-open Patent Publication No. 2002-123406.

SUMMARY

According to an aspect of the embodiment, an information processing apparatus, includes: a first nonvolatile storage device; and a processor coupled to the first nonvolatile storage device, wherein the processor is configured to: suspend, when receiving a write request of data from an application, a write process for the write request in a case where second writing of the data into a second nonvolatile storage device of a different information processing apparatus fails while first writing of the data into the first nonvolatile storage device succeeds; record, after the write process is suspended, error information indicative of an error of the second writing; resume, after the error information is recorded, the write process and issue a notification of the application of completion of the write process; and isolate, after the notification of the completion of the write process is issued, a region of the second nonvolatile storage device which is used by the application.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A to 1I depict an example of a write process by an information processing system;

FIG. 10 depicts an example of a process for updating configuration information;

DESCRIPTION OF EMBODIMENT

For example, mirroring between information processing apparatus that use a local disk apparatus has such advantageous that it makes it possible to construct a cluster system without a shared storage system, that it makes failover to a remote location, that it suppresses a storage housing from becoming a single point of failure and so forth. Here, the cluster system is a system in which a plurality of information processing apparatus cooperate so as to operate as one system.

For example, if a failed node is detected, the failed node is associated with a slice of a management target, and it is decided whether a slice of the failed node is included in slices managed by a different storage node. If a slice of the failed node is included, mirroring is not performed. Since the storage service is continued without isolation of the failed node, the storage service is continued also in the case where a control node that is to perform isolation of the failed node is inoperative.

For example, when a mirroring configuration is adopted in which a disk of a working system node is an original and a disk of a standby system node coupled to the disk of the working system node through a network is a shadow, a duplex system may be adopted which appropriately deals with failure occurrence. In the duplex system, if a failure occurs with the disk of the working system node, the node that is operating as the standby system is placed into a working state and the node that has operated as the working system till then is stopped to stop the operation as the duplex system. For example, in the duplex system, if a failure occurs with the disk of the standby system node, the node that is operating as the standby system is stopped thereby to stop operation as the duplex system. For example, in the duplex system, if a failure occurs with a network used for accessing to a shadow disk, the node that is operating as the standby system is stopped thereby to stop operation as the duplex system.

In mirroring between information processing apparatus that use a local disk apparatus, if an error occurs in writing of data into a local disk apparatus of a different information processing apparatus in regard to a data write request from an application, response to the application is not performed. Accordingly, there is a problem that processing of the application is interrupted.

Figure 14:
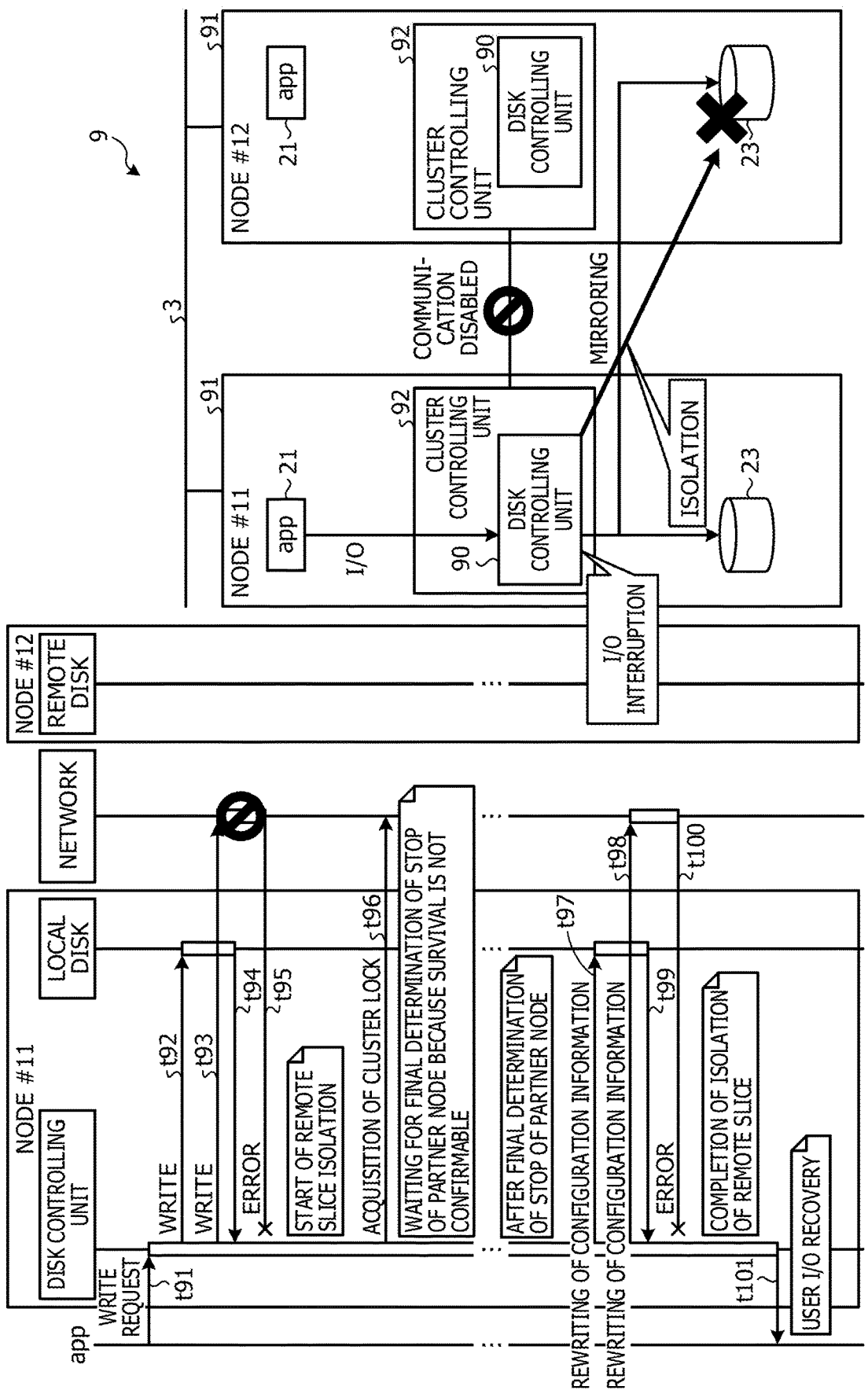
FIG. 14 depicts an example of a write process.

FIG. 14 depicts an example of a write process. Referring to FIG. 14, an information processing system 9 includes nodes 91 represented as node #11 and node #12. The nodes 91 are information processing apparatus. The node #11 and the node #12 construct a cluster system and are coupled to each other by a network 3. The network 3 is used for all of access to a remote hard disk, heartbeat, and confirmation of stop of the nodes 91. The remote disk is a disk apparatus 23 included in a different node 91 that configures the cluster system.

In each node 91, an application represented by an app 21 operates. The app 21 performs writing of data into the disk apparatus 23 and reading out of data from the disk apparatus 23 through a cluster controlling unit 92. The cluster controlling unit 92 performs processing relating to the cluster system and includes a disk controlling unit 90.

The disk controlling unit 90 controls writing of data into the disk apparatus 23 and reading out of data from the disk apparatus 23. When the disk controlling unit 90 of the node #11 writes data into the disk apparatus 23 of the own apparatus, it writes the data also into the disk apparatus 23 of the node #12. For example, the disk controlling unit 90 performs mirroring.

If the disk controlling unit 90 of the node #11 accepts a write request for data from the app 21 (t91), it performs writing (WRITE) of data on a local disk (t92) and further performs write (WRITE) of data on a remote disk through the network 3 (t93).

The disk controlling unit 90 of the node #11 accepts a response of write completion from the local disk (t94). On the other hand, in the case where the network 3 and the node #12 have some abnormality, the node #11 fails to communicate with the node #12, and therefore, the disk controlling unit 90 of the node #11 receives a notification of ERROR (t95). For example, in the case where the information processing system 9 is configured for disaster countermeasures, when a disaster occurs, some abnormality occurs with the network 3 and the node #12.

Then, if the notification of ERROR is accepted, the disk controlling unit 90 of the node #11 performs isolation of a remote slice. The slice is partial data of the data to be used by the app 21 of the node #11. In order to perform isolation of the remote slice, the disk controlling unit 90 of the node #11 tries to acquire a cluster lock (t96). The cluster lock is a key that is used for exclusive control between the nodes 91 that construct the cluster system.

Since the disk controlling unit 90 of the node #11 fails to communicate with the node #12, it fails to acquire the cluster lock. Since the network 3 is used for access to a remote disk and heartbeat, the disk controlling unit 90 of the node #11 fails to confirm survival of the node #12. Since the network 3 is used also for confirmation of stop of the node #12, the disk controlling unit 90 of the node #11 fails to perform confirmation of stop of the node #12. Accordingly, the disk controlling unit 90 of the node #11 enters a stop determination waiting state of the node #12 and fails to perform a response to the app 21.

If an operator confirms stop of the node #12 and confirmation of stop of the node #12 is conveyed to the node #11, the disk controlling unit 90 of the node #11 performs rewriting of configuration information of the local disk (t97) and performs rewriting of configuration information of the remote disk (t98).

The configuration information is information relating to the configuration of the cluster system and includes information relating to a state for each slice. As the state of a slice, for example, there are normal, isolation and so forth. In order to change the configuration information, exclusive operation between the nodes 91 is required. To this end, the disk controlling unit 90 of the node #11 tries to acquire a cluster lock at t96.

The disk controlling unit 90 of the node #11 receives a response of write completion from the local disk (t99). Meanwhile, since the network 3 is abnormal, the disk controlling unit 90 of the node #11 receives a notification of ERROR (t100). The disk controlling unit 90 of the node #11 performs user I/O recovery by issuing a response of write completion to the app 21 (t101). In this case, although response to the app 21 is performed, the time required for the response is long.

For example, interruption of the application may be reduced.

FIGS. 1A to 1I depict an example of a write process in an information processing system. Referring to FIGS. 1A to 1I, an information processing system 1 includes nodes 2 represented by node #1 and node #2. The nodes 2 are information processing apparatus. The node #1 and the node #2 construct a cluster system and are coupled to each other by a network 3. The network 3 is used for all of access to a remote disk, heartbeat, and conformation of stop of a node 2. It is to be noted that the information processing system 1 may construct a cluster system using three or more nodes 2.

In each node 2, an application represented by app 21 operates. The app 21 performs writing of data into a disk apparatus 23 and reading out of data from the disk apparatus 23 through a cluster controlling unit 22. The cluster controlling unit 22 performs processing relating to the cluster system and includes a disk controlling unit 30.

The disk controlling unit 30 controls writing of data into the disk apparatus 23 and reading out of data from the disk apparatus 23. When the disk controlling unit 30 of the node #1 writes data into the disk apparatus 23 of the own apparatus, it writes the data also into the disk apparatus 23 of the node #2. For example, the disk controlling unit 30 performs mirroring.

As depicted in FIG. 1A, when the disk controlling unit 30 of the node #1 receives a write request of data from the app 21 (t1), it performs writing (WRITE) of data on the local disk (t2) and performs writing (WRITE) of the data also on the remote disk through the network 3 (t3).

As depicted in FIG. 1B, the disk controlling unit 30 of the node #1 receives a response of write completion from the local disk (t4). On the other hand, in the case where the network 3 and the node #2 have some abnormality, since the node #1 fails to communicate with the node #2, the disk controlling unit 30 of the node #1 receives a notification of ERROR (t5).

Figure 1C:
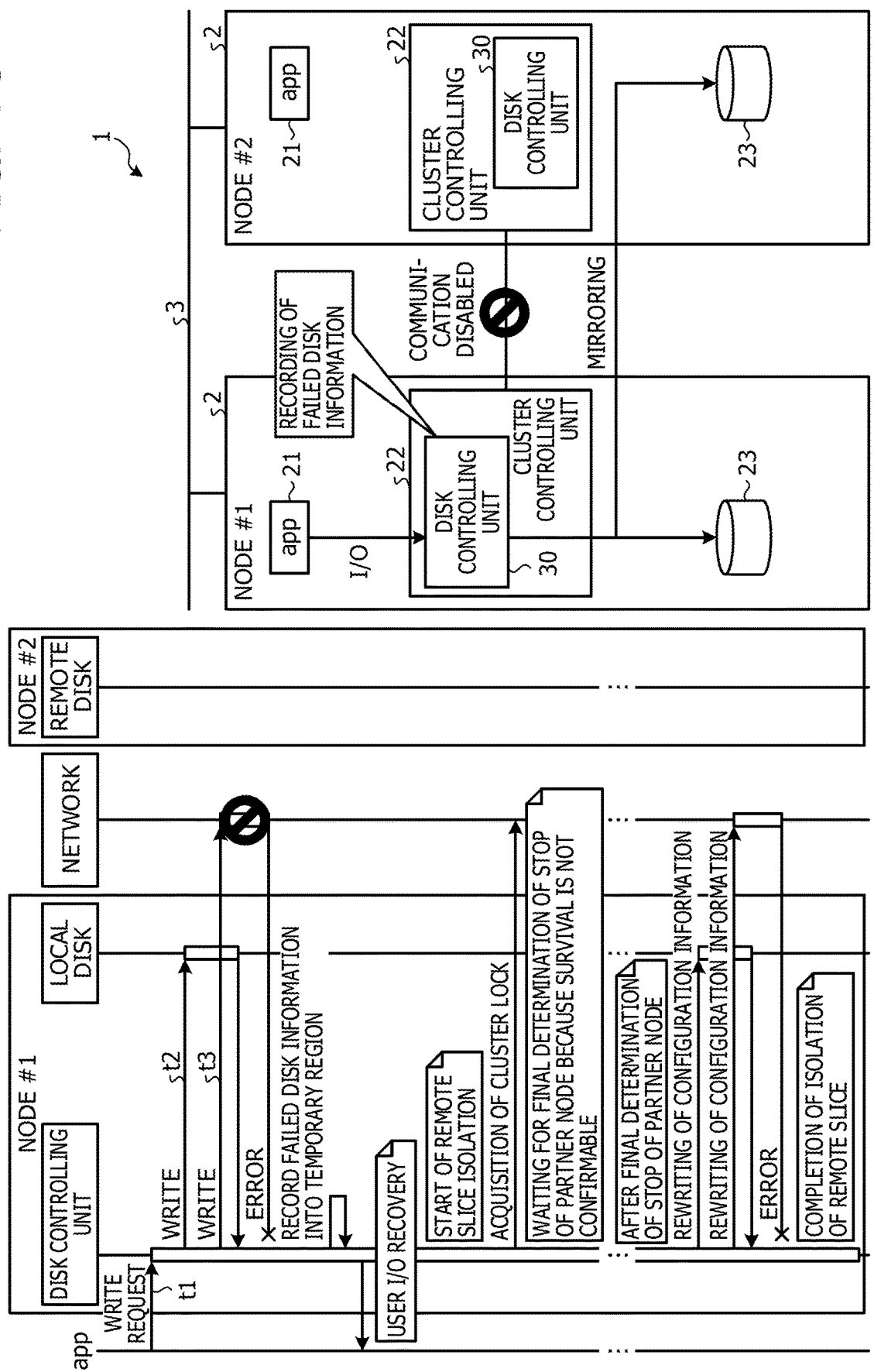
Figure 1D:
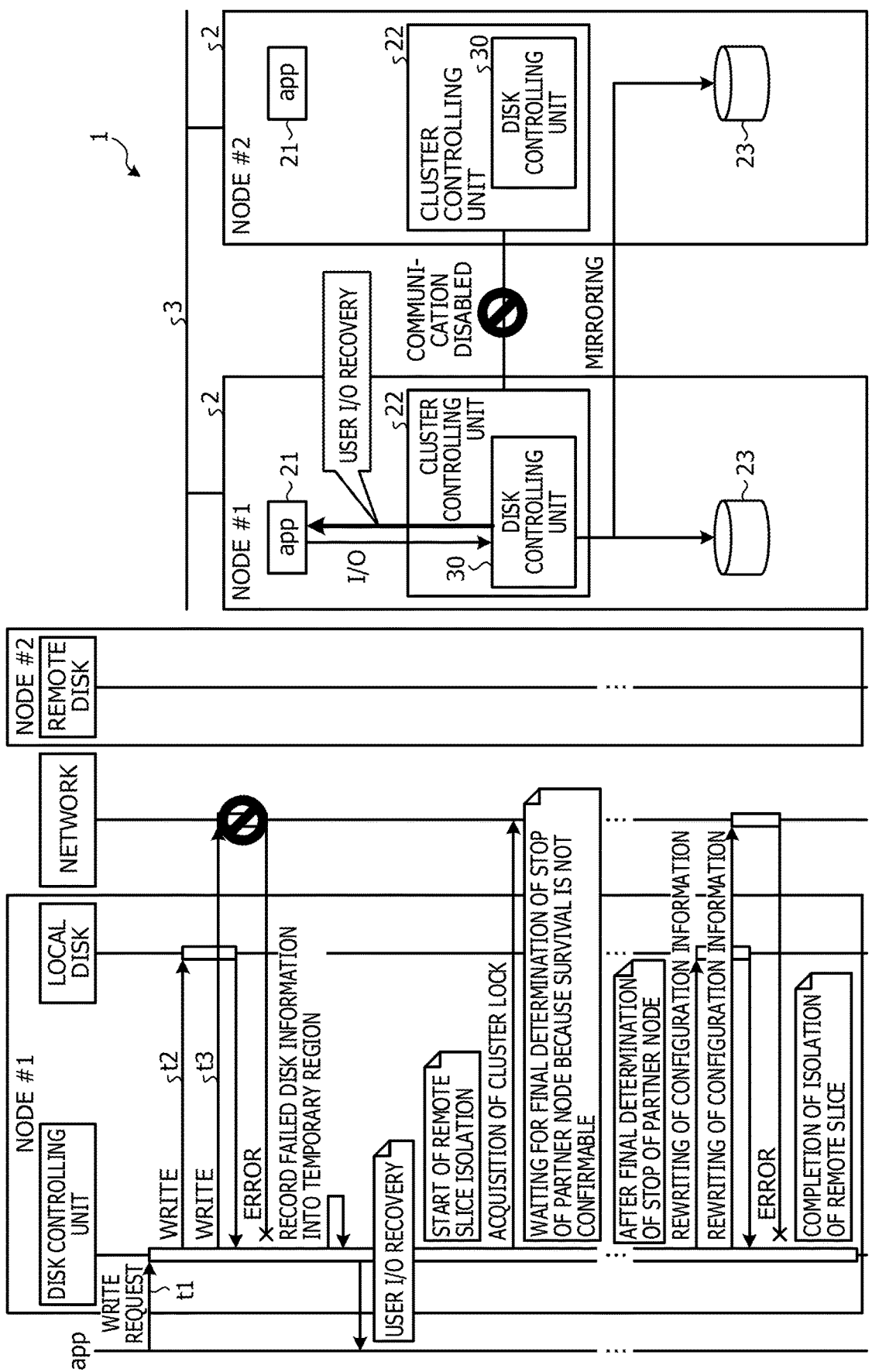

As depicted in FIG. 1C, the disk controlling unit 30 of the node #1 suspends a write process and records failed disk information into a given region that may be accessed also from the different node 2 (t6). Then, as depicted in FIG. 1D, the disk controlling unit 30 of the node #1 resumes a write process and performs user I/O recovery by issuing a response of write completion to the app 21 (t7).

The disk controlling unit 30 of the node #1 performs isolation of the remote slice as depicted in FIG. 1E. The disk controlling unit 30 of the node #1 tries to acquire a cluster lock in order to perform isolation of the remote slice (t8).

Since the disk controlling unit 30 of the node #1 fails to communicate with the node #2, it fails to acquire the cluster lock. Since the network 3 is used for access to the remote disk and heartbeat, the disk controlling unit 30 of the #1 fails to perform confirmation of survival of the node #2. Furthermore, since the network 3 is used also for confirmation of stop of the node #2, the disk controlling unit 30 of the node

1 fails to perform confirmation of stop the node #2. Accordingly, the disk controlling unit 30 of the node #1 enters a stop determination waiting state of the node #2 as depicted in FIG. 1F.

Figure 1G:
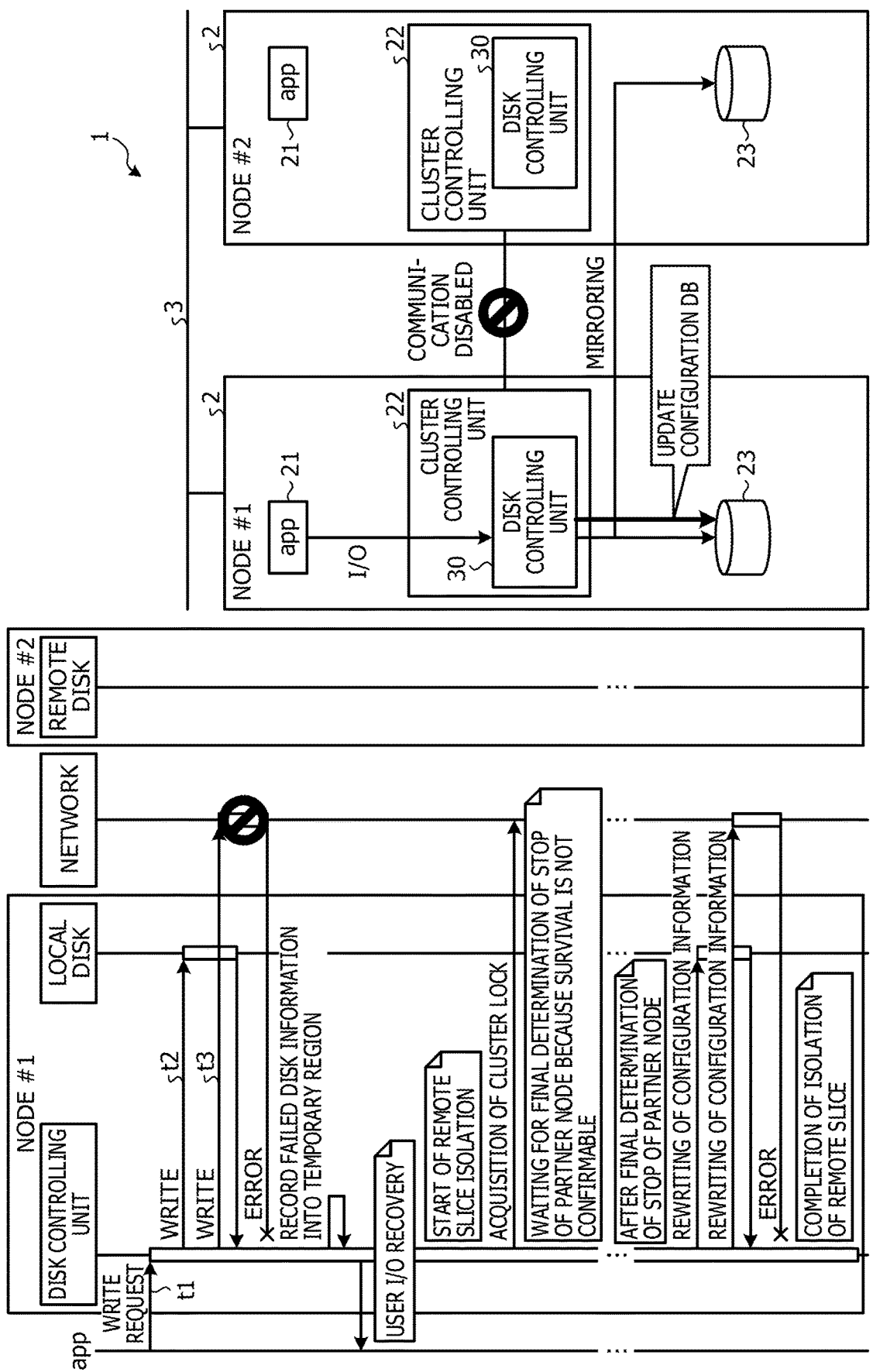

Thereafter, confirmation of stop of the node #2 is performed by the operator, and when confirmation of stop of the node #2 is conveyed to the node #1, the disk controlling unit 30 of the node #1 performs rewriting of the configuration information of the local disk as depicted in FIG. 1G (t9).

Figure 1H:
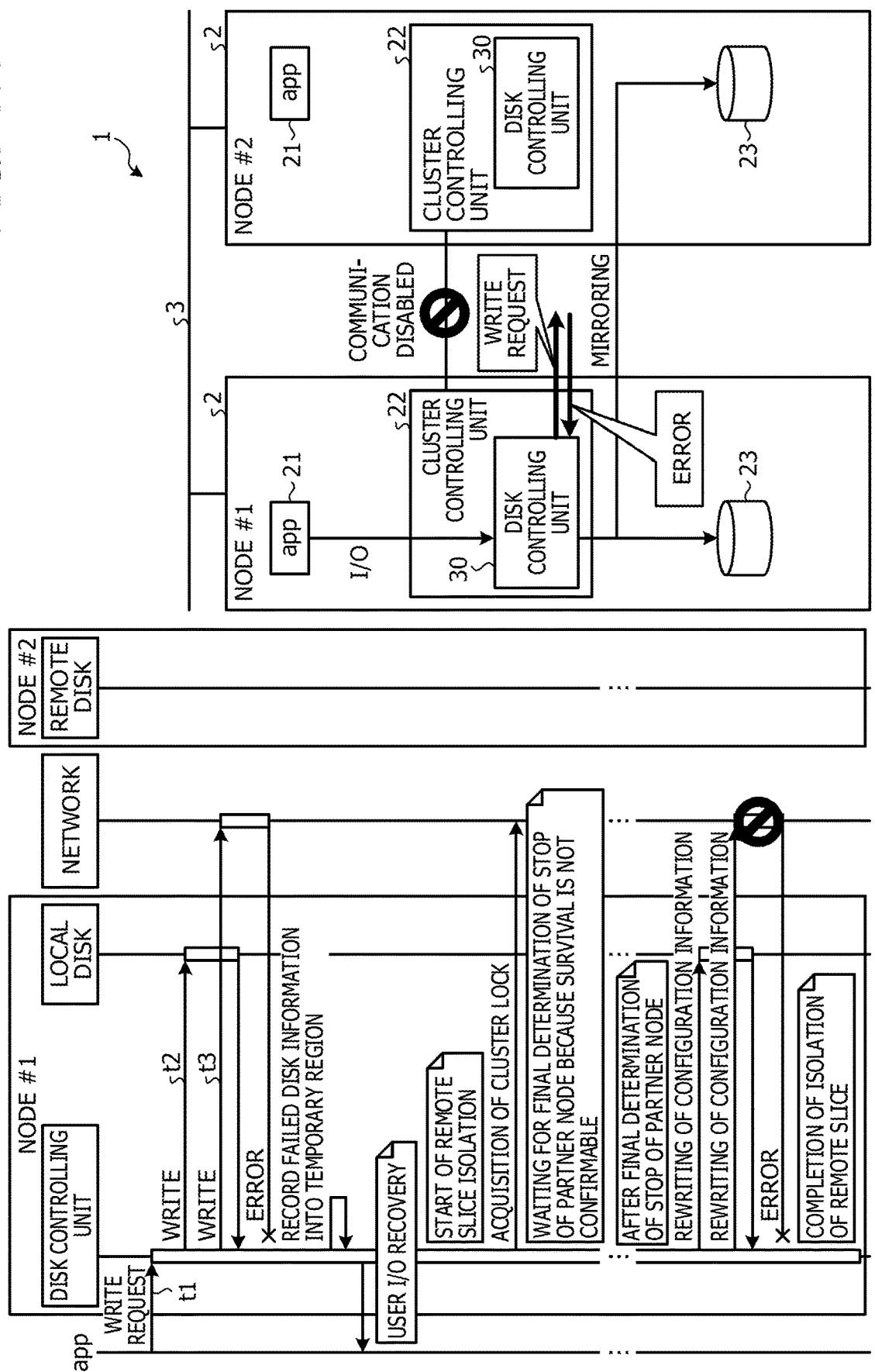

The disk controlling unit 30 of the node #1 performs rewriting of the configuration information of the remote disk as depicted in FIG. 1H (t10). Then, the disk controlling unit 30 of the node #1 receives a response of write completion from the local disk (t11). On the other hand, since the network 3 and the node #2 have some abnormality, the disk controlling unit 30 of the node #1 receives a notification of ERROR (t12). As depicted in FIG. 1I, the disk controlling unit 30 of the node #1 completes the slice isolation.

In this manner, in the case where the network 3 has some abnormality, the disk controlling unit 30 of the node #1 records failed disk information into a given region that is accessible from the different node 2 and performs user I/O recovery in response to completion of writing into the app 21. Accordingly, the disk controlling unit 30 of the node #1 may suppress interruption of the application.

Figure 2:
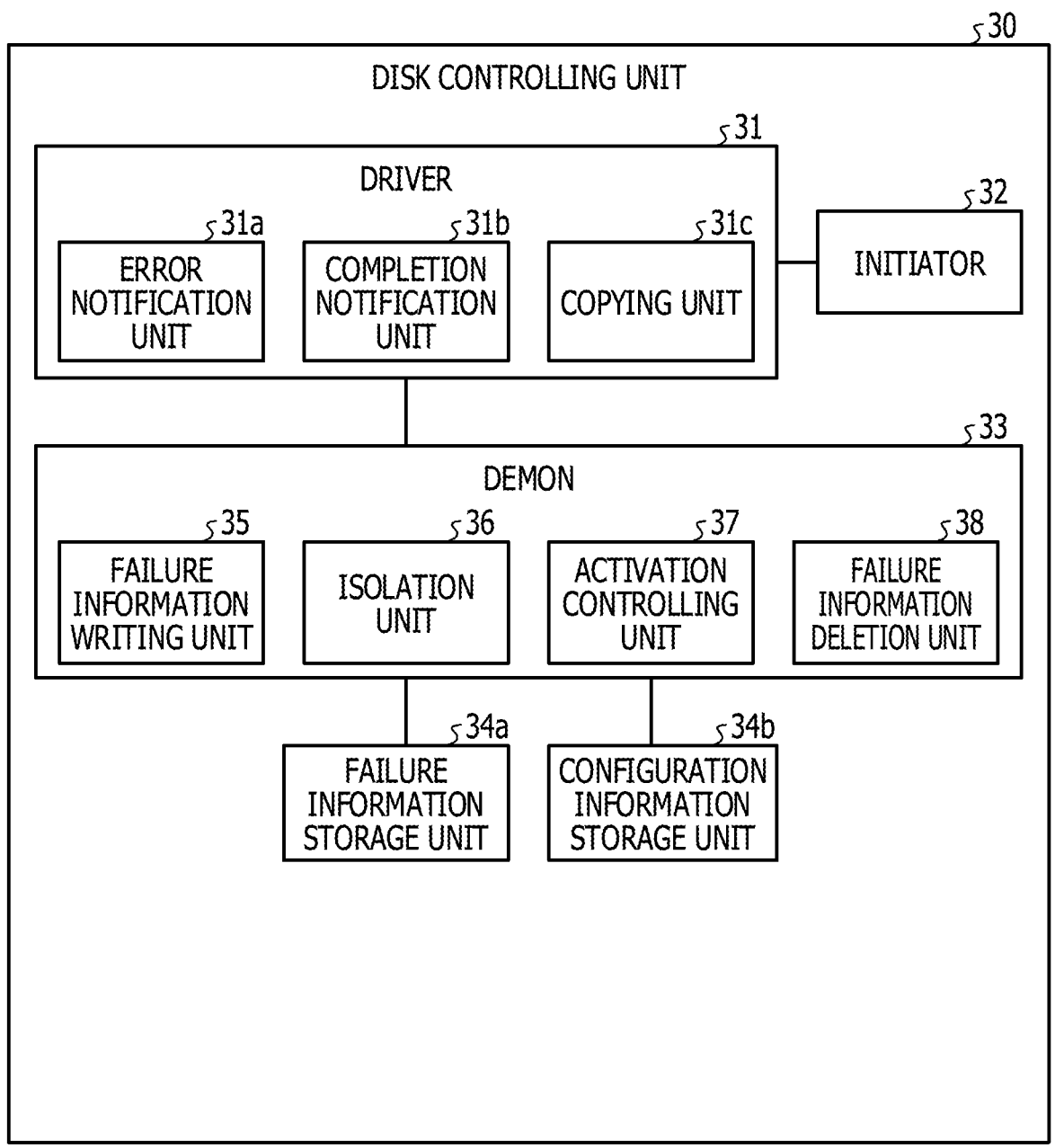
FIG. 2 depicts an example of a functional configuration of a disk controlling unit.

FIG. 2 depicts a functional configuration of a disk controlling unit. The disk controlling unit illustrated in FIG. 2 may be the disk controlling unit 30 illustrated in FIGS. 1A to 1I. Referring to FIG. 2, the disk controlling unit 30 includes a driver 31, an initiator 32, a demon 33, a failure information storage unit 34a, and a configuration information storage unit 34b.

The driver 31 controls reading out of data from the disk apparatus 23 and writing of data into the disk apparatus 23. The driver 31 accepts a write request of data from the app 21 and controls writing of data on the local disk and the remote disk. The initiator 32 performs writing of data on the remote disk in accordance with an instruction of the driver 31. The driver 31 includes an error notification unit 31a, a completion notification unit 31b, and a copying unit 31c.

If the error notification unit 31a receives a notification of occurrence of an I/O error in writing of data on the remote disk from the initiator 32, it suspends a write process and notifies the demon 33 of the I/O error.

If the completion notification unit 31b receives the notification of write completion of failed disk information from the demon 33 that receives the notification of the occurrence of an I/O error, it resumes its write process and notifies the app 21 of the write completion.

The copying unit 31c performs, for example, in the case where, upon activation of the node 2, the different node 2 is operating normally, a process for establishing matching between the local disk and the remote disk using the failed disk information.

The demon 33 performs, if it receives an event, a process corresponding to the event. As the I/O error, there are a volume activation request, a copy completion notification and so forth in addition to an I/O error.

Figures 3A, 3B:
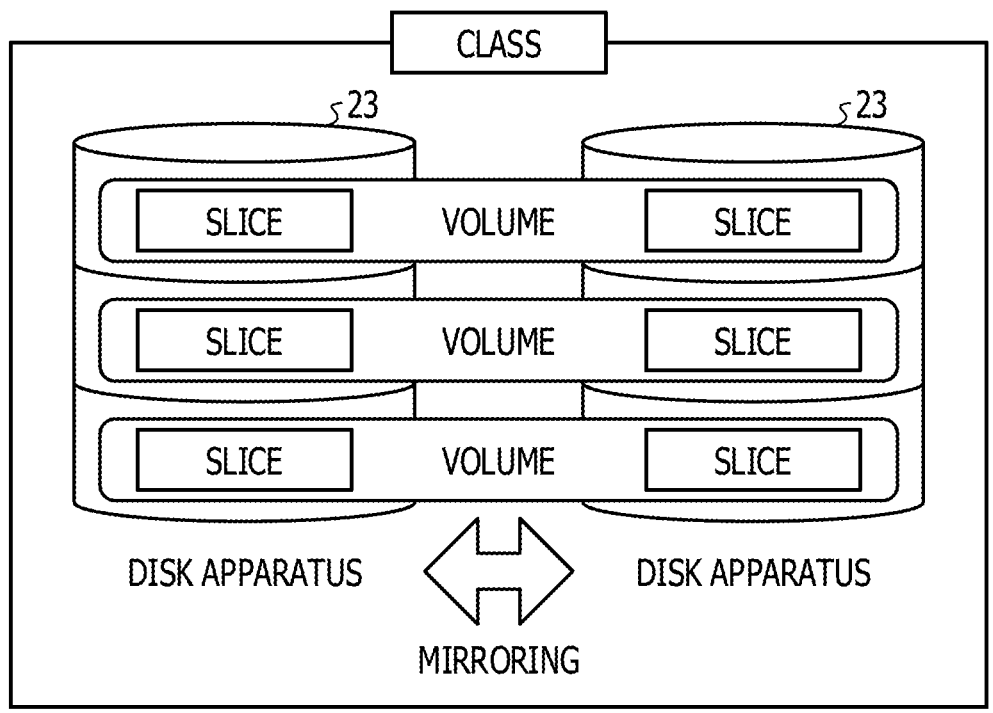
FIG. 3A depicts an example of a failure information storage unit.
FIG. 3B is a view depicting an example of a relationship among a class, a volume, and a slice.

The failure information storage unit 34a stores failed disk information therein. The information of the failure information storage unit 34a is accessible from the different node 2. FIG. 3A is a view depicting an example of a failure information storage unit. The failure information storage unit illustrated in FIG. 3A may be the failure information storage unit 34a illustrated in FIG. 2. As depicted in FIG. 3A, the failure information storage unit 34a stores, as the failed disk information, a class identification (ID), a volume ID, and a small computer system interface (SCSI) ID for each slice with which an I/O error occurs.

The class ID is an identifier for the identification of a class, and the volume ID is an identifier for the identification of a volume while the SCSI ID is an identifier for the identification of one of mirroring pairs. FIG. 3B depicts an example of a relationship between a class, a volume, and a slice. As depicted in FIG. 3B, disk apparatus 23 of a mirror ring pair are managed as a class, and the class includes a plurality of volumes. Each volume is configured from a slice of a mirroring pair. Accordingly, a slice is specified by a class ID, a volume ID, and a SCSI ID.

The configuration information storage unit 34b stores configuration information. For example, the configuration information storage unit 34b stores information relating to a configuration of the cluster system. The configuration information storage unit 34b stores a state for each slice.

Referring back to FIG. 2, the demon 33 includes a failure information writing unit 35, an isolation unit 36, an activation controlling unit 37, and a failure information deletion unit 38. The failure information writing unit 35 writes failed disk information into the failure information storage unit 34a in the case where it fails to write data on the remote disk. Then, the failure information writing unit 35 notifies the driver 31 that the failed disk information has been written into the failure information storage unit 34a.

The isolation unit 36 performs isolation of the remote slice in the case where it fails to write data on the remote disk. For example, the isolation unit 36 acquires a cluster lock and performs change of the configuration information.

The activation controlling unit 37 acquires, upon activation of the volume, field disk information recorded in the own node 2 and failed disk information recorded in the remote node 2 and updates the configuration information based on the acquired failure information.

The failure information deletion unit 38 deletes, if matching is established between slices of the mirroring pair by a copy process, the information regarding the slice whose matching is established from the failed disk information and changes the state of the slice in the configuration information to a normal state.

Figure 4:
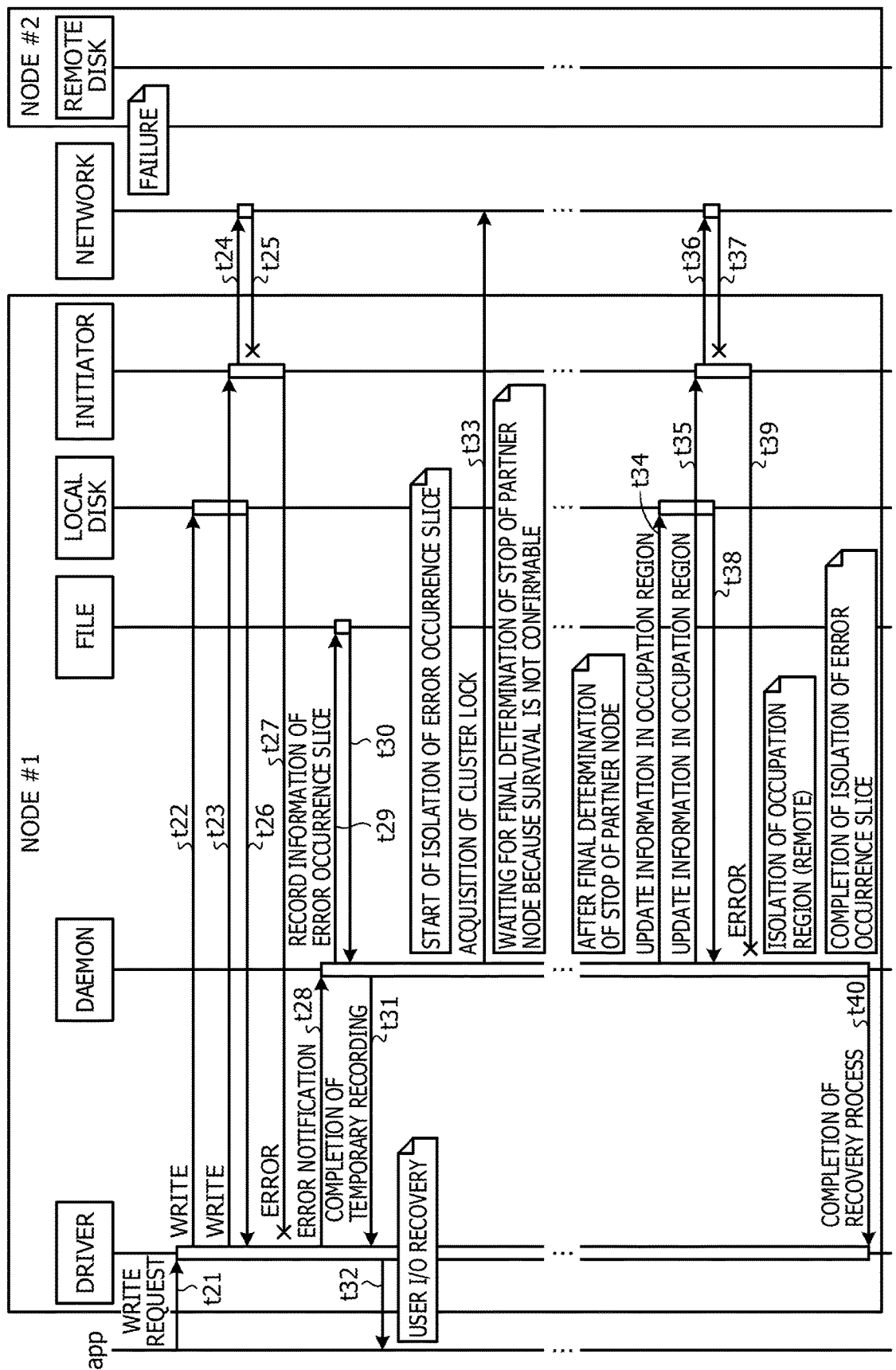
FIG. 4 depicts an example of a sequence in the case where a write error occurs on a remote disk.

FIG. 4 depicts an example of a sequence in the case where a write error occurs with a remote disk.

As depicted in FIG. 4, if the driver 31 of the node #1 accepts a write request of data from the app 21 (t21), it performs writing (WRITE) of the data on the local disk (t22). Then, the driver 31 of the node #1 requests the initiator 32 to write the data on the remote disk (t23).

Although the initiator 32 performs writing of data on the remote disk through the network 3 (t24), since the network 3 and the node #2 are in an abnormal state, the initiator 32 fails in writing of the data and is notified of the error (t25).

Then, the driver 31 receives a response of write completion from the local disk (t26) and receives a notification of ERROR from the initiator 32 (t27). The driver 31 suspends the write process and issues a notification of ERROR to the demon 33 (t28). Consequently, the demon 33 records information of the error occurrence slice into a file (t29). The recording of the information of the error occurrence slice corresponds to recording of failed disk information, and the demon 33 writes the class ID, volume ID, and SCSI ID into the file. The file corresponds to the failure information storage unit 34a.

If the demon 33 receives a response of writing of the class ID, volume ID, and SCSI ID (t30), it notifies the driver 31 of temporary recording completion (t31). Temporary recording is to record information of an error occurrence slice into the file. Then, the driver 31 resumes the write process and performs user I/O recovery by issuing a response of write completion to the app 21 (t32).

The demon 33 performs isolation of the error occurrence slice after the notification of the temporary recording completion to the driver 31. Although the demon 33 tries to acquire a cluster clock (t33) as isolation of the error occurrence slice, since it fails to communicate with the node #2, it fails to acquire the cluster lock.

Since the network 3 is used for access to the hard disk and heartbeat, the node #1 fails to confirm survival of the node #2. Furthermore, since the network 3 is used also for confirmation of stop of the node #2, the node #1 fails to confirm stop of the node #2. Accordingly, the demon 33 enters a stop determination waiting state of the node #2.

Thereafter, confirmation of stop of the node #2 is performed by the operator, and if the confirmation of stop of the node #2 is conveyed to the node #1, the demon 33 updates information of an occupation region (t34). The occupation region is a region in which the configuration information is stored. The demon 33 requests the initiator 32 to update information of the occupation region of the remote disk (t35).

The initiator 32 performs updating of information of an occupation region of the remote disk through the network 3 (t36). However, since the network 3 and the node #2 are abnormal, the initiator 32 fails in update and receives a notification of an error (t37).

The demon 33 receives a response from the local disk (t38) and receives a notification of ERROR from the initiator 32 (t39). Then, the demon 33 performs isolation of the occupation region (remote) and completes the isolation of the error occurrence slice. The demon 33 notifies the driver 31 of completion of the recovery process (t40).

Figure 5:
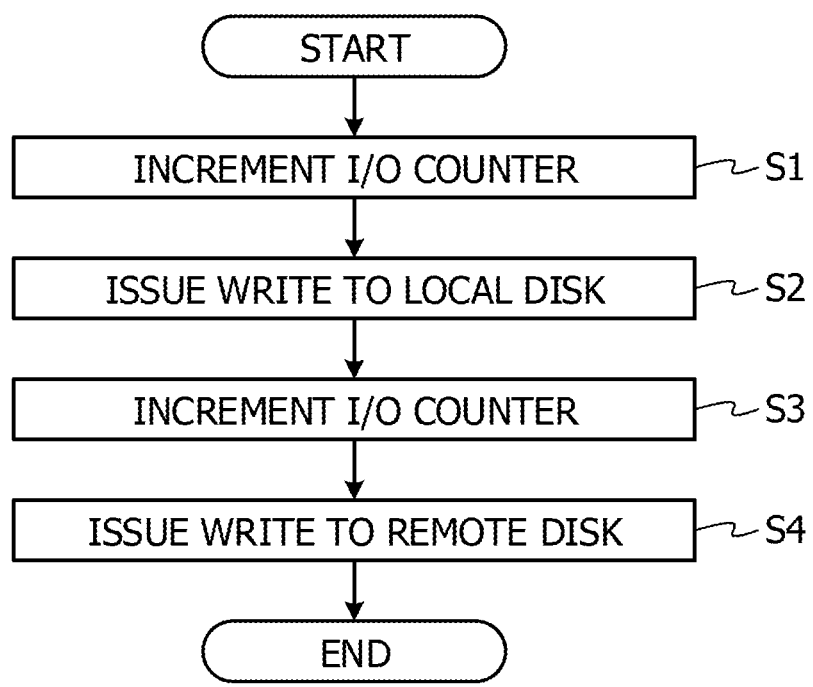
FIG. 5 depicts an example of a write process by a driver.

FIG. 5 depicts an example of a write process by a driver. The driver illustrated by reference to FIG. 5 may be the driver 31 illustrated in FIG. 2. As depicted in FIG. 5, the driver 31 increments an I/O counter (step S1). The I/O counter is a counter that counts the number of issued WRITE instructions.

The driver 31 issues a WRITE instruction to the local disk (step S2) and increments the I/O counter (step S3). The driver 31 issues a WRITE instruction to the remote disk (step S4).

Every time the driver 31 issues a WRITE instruction, it increments the I/O counter in this manner such that it may decide whether or not a response to the issued WRITE instruction is received.

Figure 6:
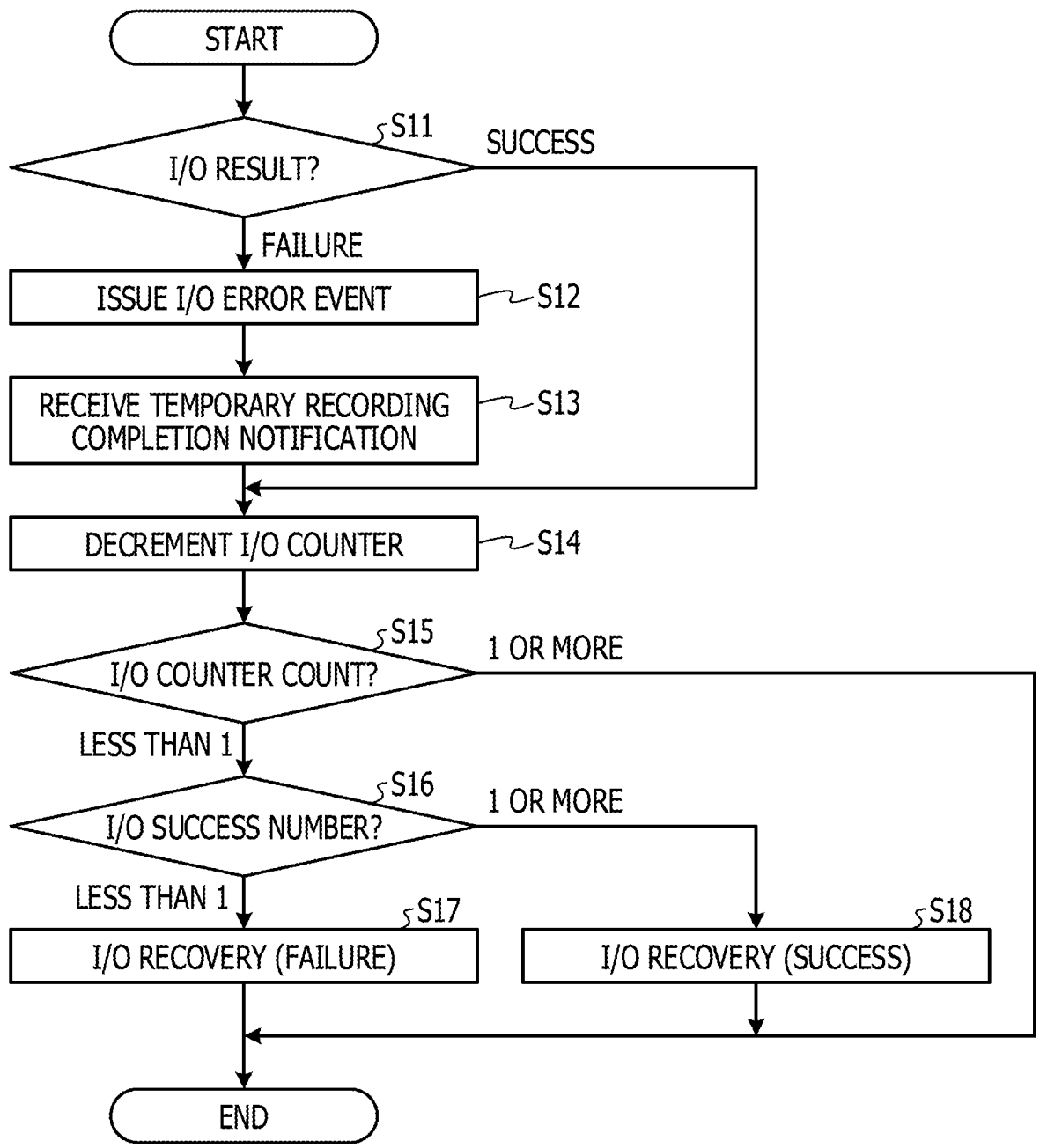
FIG. 6 depicts an example of an interrupt process upon completion of writing.

FIG. 6 depicts an example of an interrupt process upon completion of writing. If the WRITE instruction issued from the driver 31 is completed, an interrupt occurs. According, if the driver 31 issues a WRITE instruction to the local disk and the remote disk, the process depicted in FIG. 6 is executed twice.

As depicted in FIG. 6, the driver 31 decides an I/O result in the interrupt process (step S11). If the I/O result indicates a failure, the driver 31 issues an I/O error event to the demon 33 (step S12). The driver 31 receives a temporary recording completion notification from the demon 33 (step S13). On the other hand, if the I/O result indicates success, the driver 31 advances its processing to step S14.

The driver 31 decrements the I/O counter (step S14) and decides the I/O counter count (step S15). In the case where the I/O counter count is equal to or greater than 1, since the current process is a first time interrupt process after issuance of the two WRITE instructions, the driver 31 ends the interrupt process.

On the other hand, in the case where the I/O counter count is less than 1, since the current process is a second time interrupt process after the two WRITE instructions are issued, the driver 31 decides an I/O success number (step S16). The I/O success number is the number of successes of I/O in regard to the disk apparatus 23. In the case where the I/O success number is less than 1, this indicates failure in the I/O and the driver 31 performs user I/O recovery (step S17), but in the case where the I/O success number is equal to or greater than 1, this indicates success in the I/O and the driver 31 performs user I/O recovery (step S18).

In the case where an issued WRITE instruction results in failure, the driver 31 may record occurrence of an I/O error by issuing an I/O error event to the demon 33 in this manner.

Figure 7:
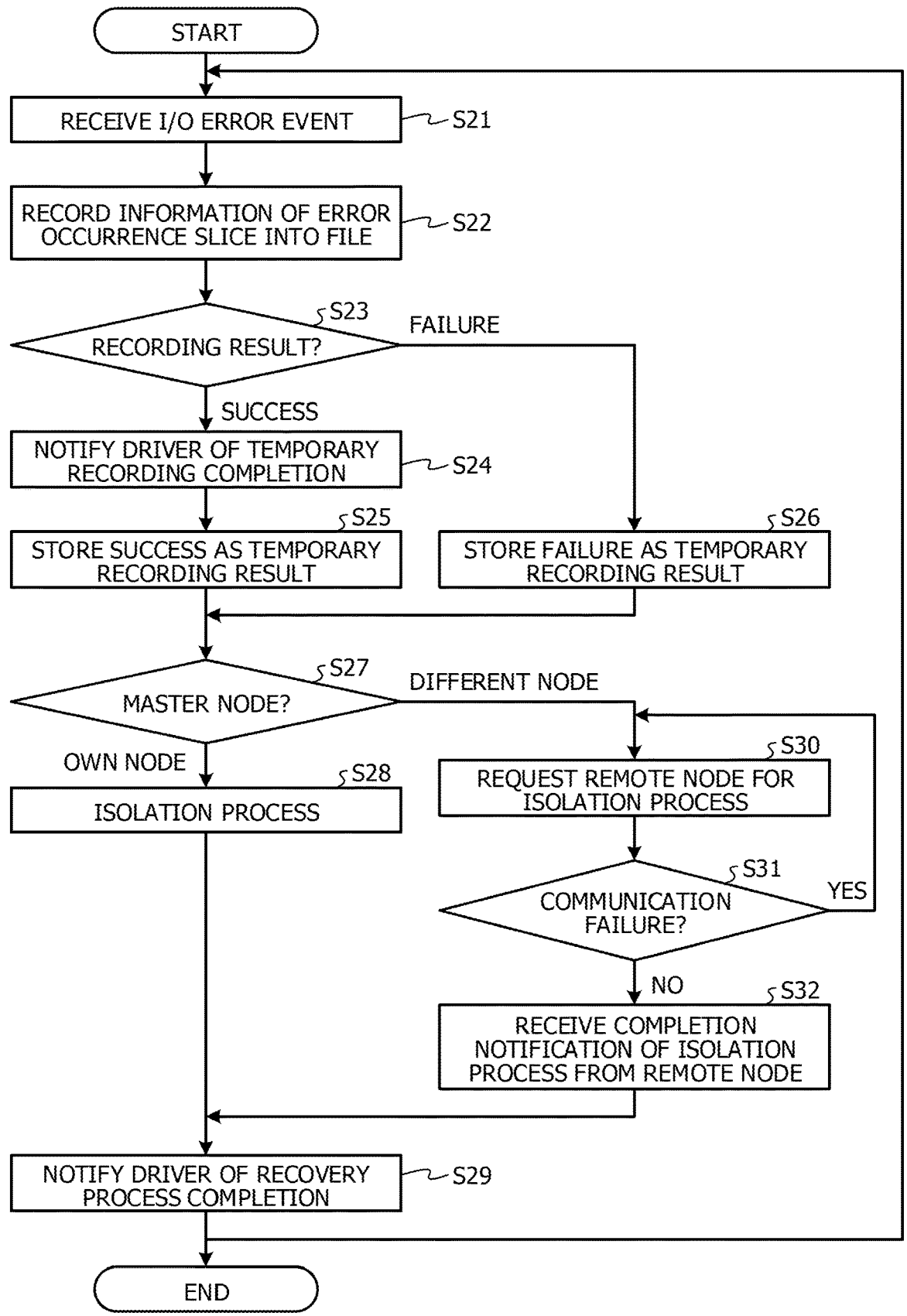
FIG. 7 depicts an example of a process performed by a demon in regard to an input/output (I/O) error event.

FIG. 7 depicts an example of a process performed by a demon in regard to an I/O error event. The demon illustrated by reference to FIG. 7 may be the demon 33 illustrated in FIG. 2. As depicted in FIG. 7, if the demon 33 receives an I/O error event (step S21), it records information of an error occurrence slice into the file (step S22).

The demon 33 decides a recording result (step S23), and in the case where the recording result indicates success, the demon 33 notifies the driver 31 of temporary recording completion (S24) and stores success as a temporary recording result into the memory (step S25). On the other hand, in the case where the recording result indicates failure, the demon 33 stores failure as a temporary recording result into the memory (step S26).

The demon 33 decides whether or not the own node is the master node 2 (step S27). Here, the master node 2 is a node 2 that operates as a master in the cluster system and is a node 2 that performs update and so forth of configuration information. Then, in the case where the own node is the master node 2, the demon 33 executes an isolation process for updating the configuration information (step S28). The demon 33 notifies the driver 31 of recovery process completion (step S29).

On the other hand, in the case where the own node is not the master node 2, the demon 33 requests the remote node 2 to perform an isolation process (step S30) and decides whether or not the communication results in failure (step S31). In the case where the demon 33 fails in communication, it returns its processing to step S30, but in the case where the demon 33 succeeds in communication, it receives a completion notification of the isolation process from the remote node 2 (step S32). The demon 33 notifies the driver 31 of recovery process completion (step S29).

In this manner, if the demon 33 receives an I/O error event, by recording information of the error occurrence slice into the file and notifying the driver 31 of temporary recording completion, the driver 31 may notify the app 21 of completion of a write process before an isolation process.

Figure 8:
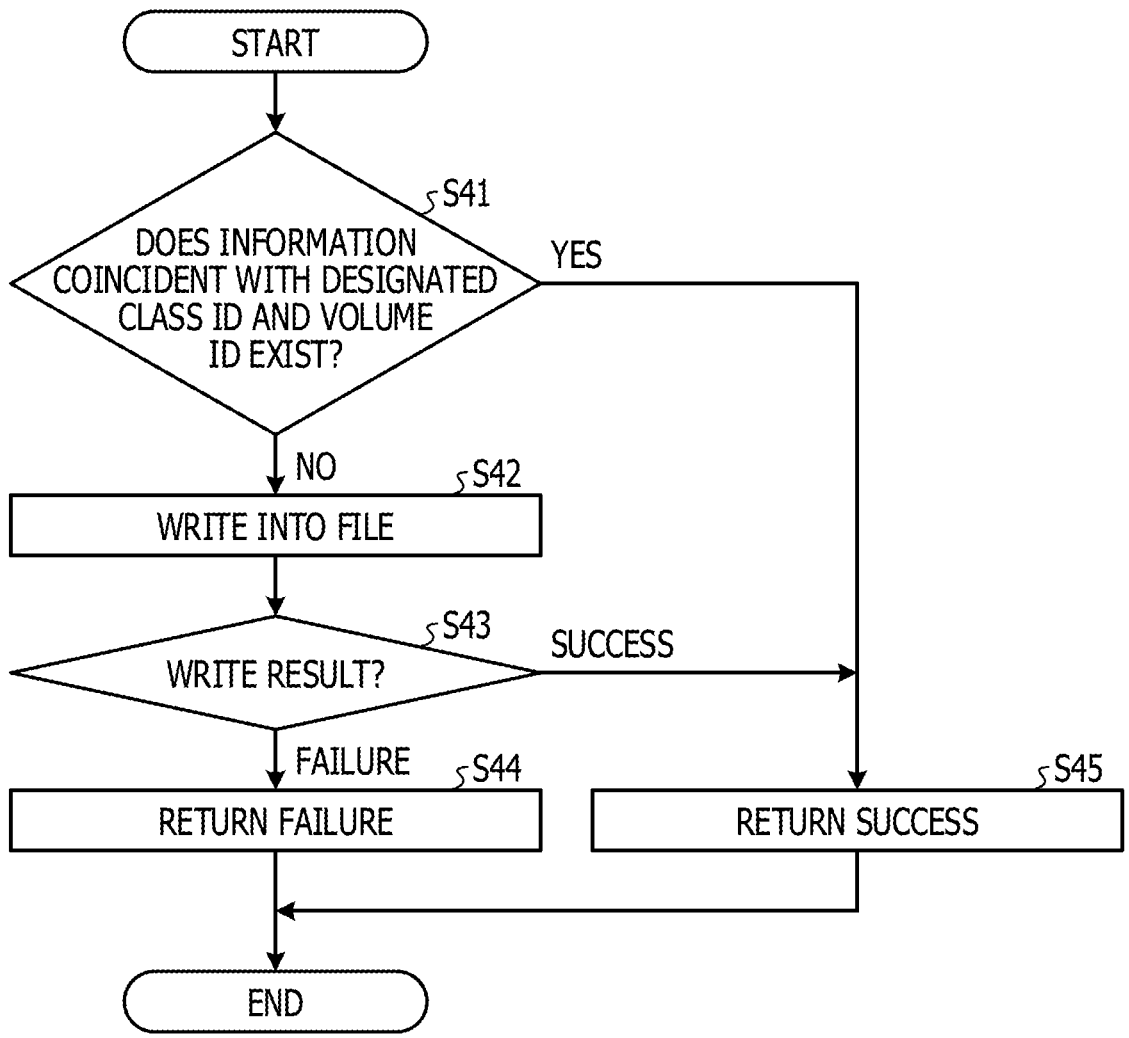
FIG. 8 depicts an example of a process for temporarily recording information of an error occurrence slice.

FIG. 8 depicts an example of a process for temporarily recording information of an error occurrence slice. The process of FIG. 8 corresponds to the process at step S22 depicted in FIG. 7. As depicted in FIG. 8, the demon 33 decides whether or not there already is information that coincides with a class ID and a volume ID designated as the error occurrence slice (step S41), and if there already is such information, the processing advances to step S45.

On the other hand, if there is no information that coincides with the class ID and the volume ID designated as the error occurrence slice, the demon 33 writes the designated class ID, volume ID, and SCSI ID into the file (step S42). The demon 33 decides a write result (step S43) and sends back failure if the writing results in failure (step S44), but sends back success if the writing results in success (step S45).

By writing the class ID, volume ID, and SCSI ID into the file in this manner, the demon 33 may record information with which an error occurrence slice may be specified.

Figure 9:
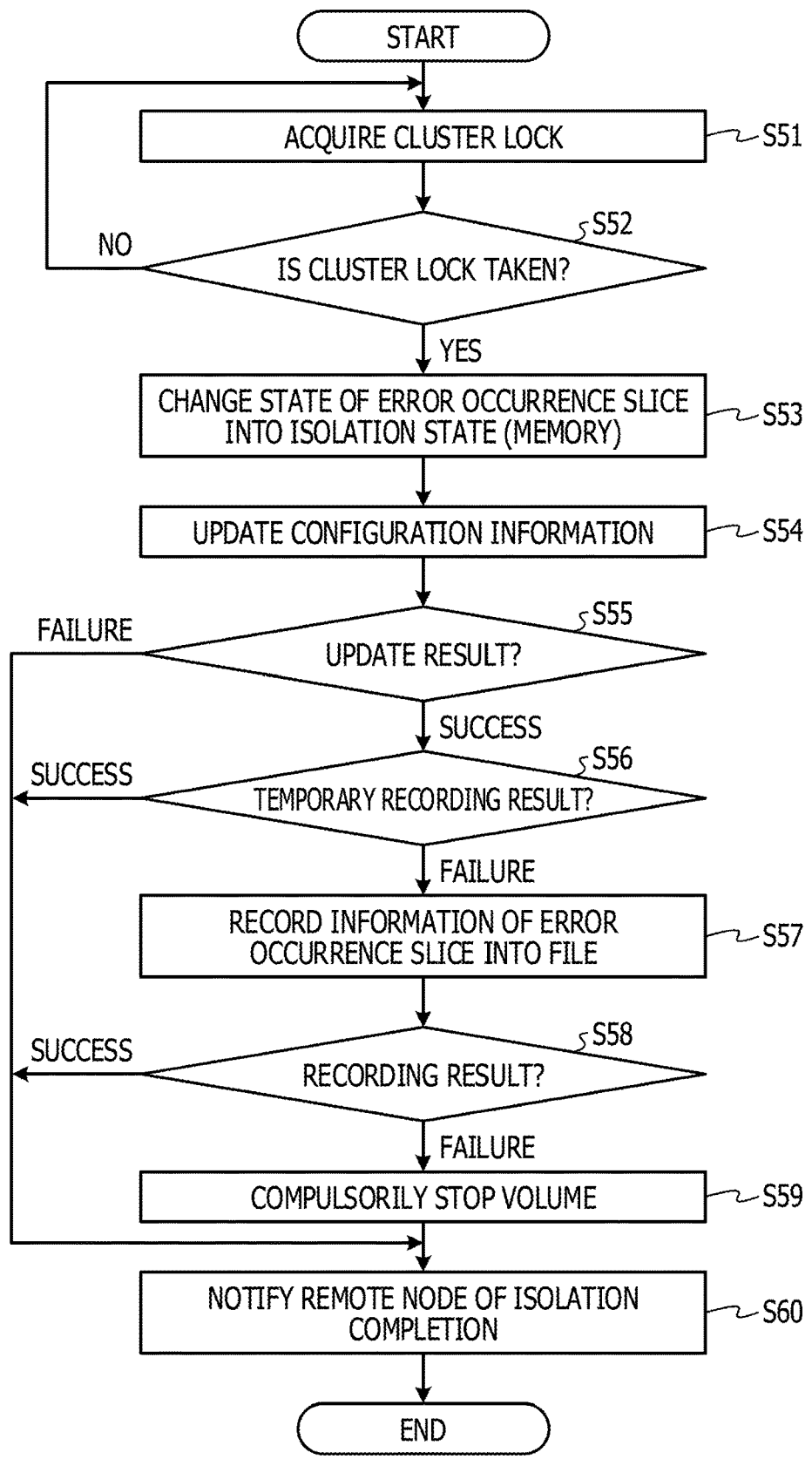
FIG. 9 depicts an example of an isolation process.

FIG. 9 depicts an example of an isolation process. As depicted in FIG. 9, the demon 33 acquires a cluster lock (step S51) and decides whether or not a cluster lock is acquired successfully (step S52). In the case where a cluster lock is not acquired successfully, the demon 33 returns its processing to step S51.

On the other hand, in the case where a cluster lock is acquired successfully, the demon 33 changes the state of the error occurrence slice in the configuration information in the memory into the isolation state (step S53) and updates the configuration information of the disk apparatus 23 (step S54). The demon 33 decides an update result (step S55) and decides, in the case where the update results in success, a temporary recording result of the memory (step S56).

In the case where the temporary recording result indicates failure, the demon 33 records the information of the error occurrence slice into the file (step S57) and decides a recording result (step S58). In the case where the recording results in failure, the demon 33 compulsorily stops the volume (step S59). The demon 33 notifies the remote node 2 of isolation completion (step S60). In the case where the own node has been the master node 2 and has performed the isolation process at step S28 of FIG. 7, the demon 33 ends the processing without notifying the remote node 2 of isolation completion.

In the case where the recording result is success at step S58, in the case where the temporary recording result of the memory is success at step S56 or in the case where the update results in failure at step S55, the demon 33 advances the processing to step S60.

In this manner, since the demon 33 changes the state of the error occurrence slice into the isolation state and updates the configuration information, it may suppress the disk controlling unit 30 from accessing to the error occurrence slice. In the case where a request for configuration information update is issued to the remote node 2 at step S30 of FIG. 7, the processes at steps S56 to S59 are performed by the node 2 by which the process at step S30 has been executed.

FIG. 10 depicts an example of a process for updating configuration information. The process of FIG. 10 corresponds to the process at step S54 depicted in FIG. 9. As depicted in FIG. 10, the demon 33 writes the configuration information on the local disk (step S71) and writes the configuration information on the remote disk (step S72). The order of steps S71 and S72 may be reversed.

The demon 33 decides the I/O success number (step S73) and, if the I/O success number is smaller than 1, compulsorily stops the volume (step S74) and sends back failure (step S75). On the other hand, in the case where the I/O success number is equal to or greater than 1, the demon 33 decides the I/O success number (step S76). In the case where the I/O success number is 1, the demon 33 isolates an occupation region of the error (step S77) and sends back success (step S78). On the other hand, in the case where the I/O success number is greater than 1, the demon 33 sends back success (step S78).

In this manner, when the demon 33 updates the configuration information, by updating both the local disk and the remote disk, the demon 33 may establish matching in configuration information between the nodes 2 that construct the cluster system.

Figure 11A:
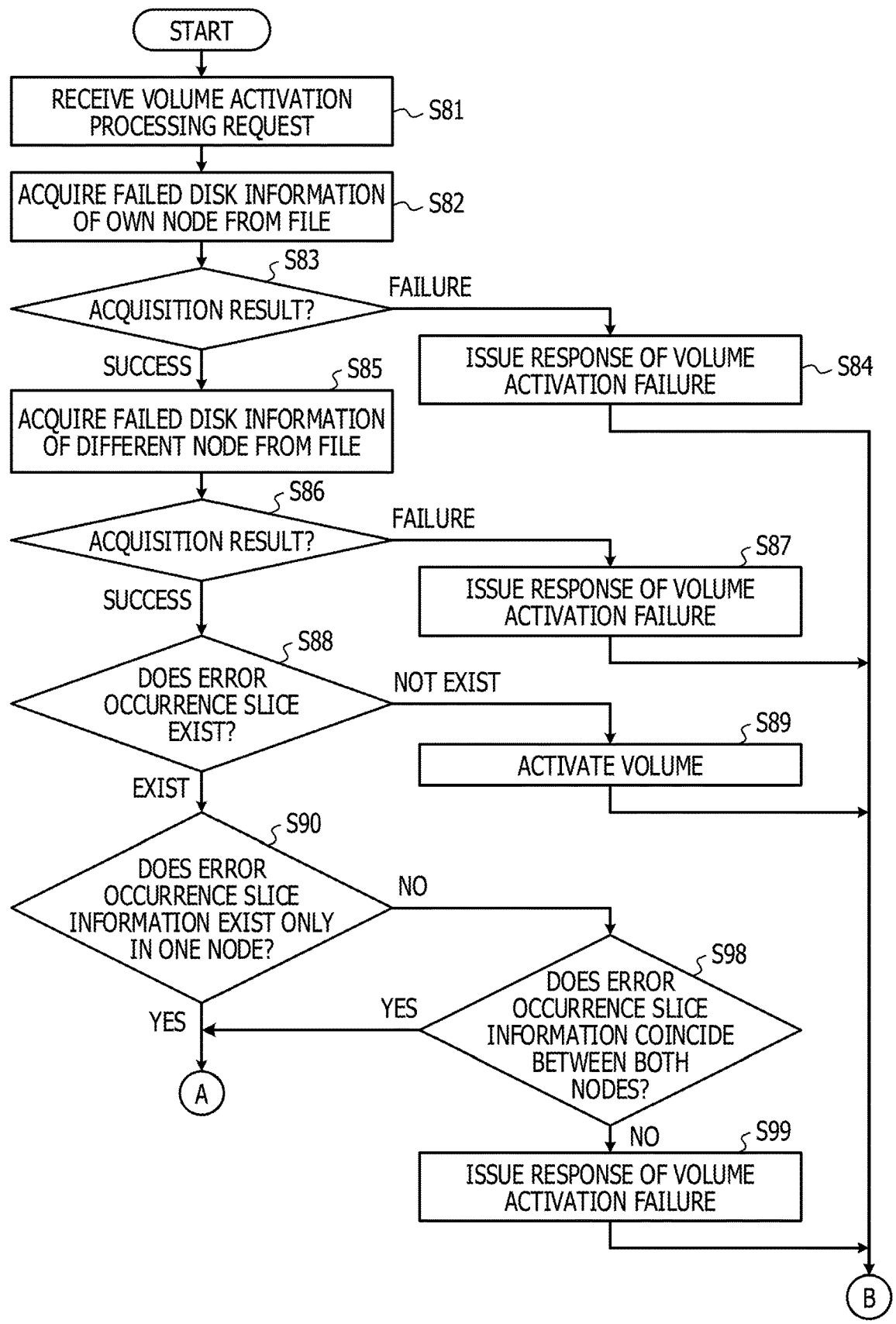
FIGS. 11A and 11B depict an example of a process upon activation of a volume.
Figure 11B:
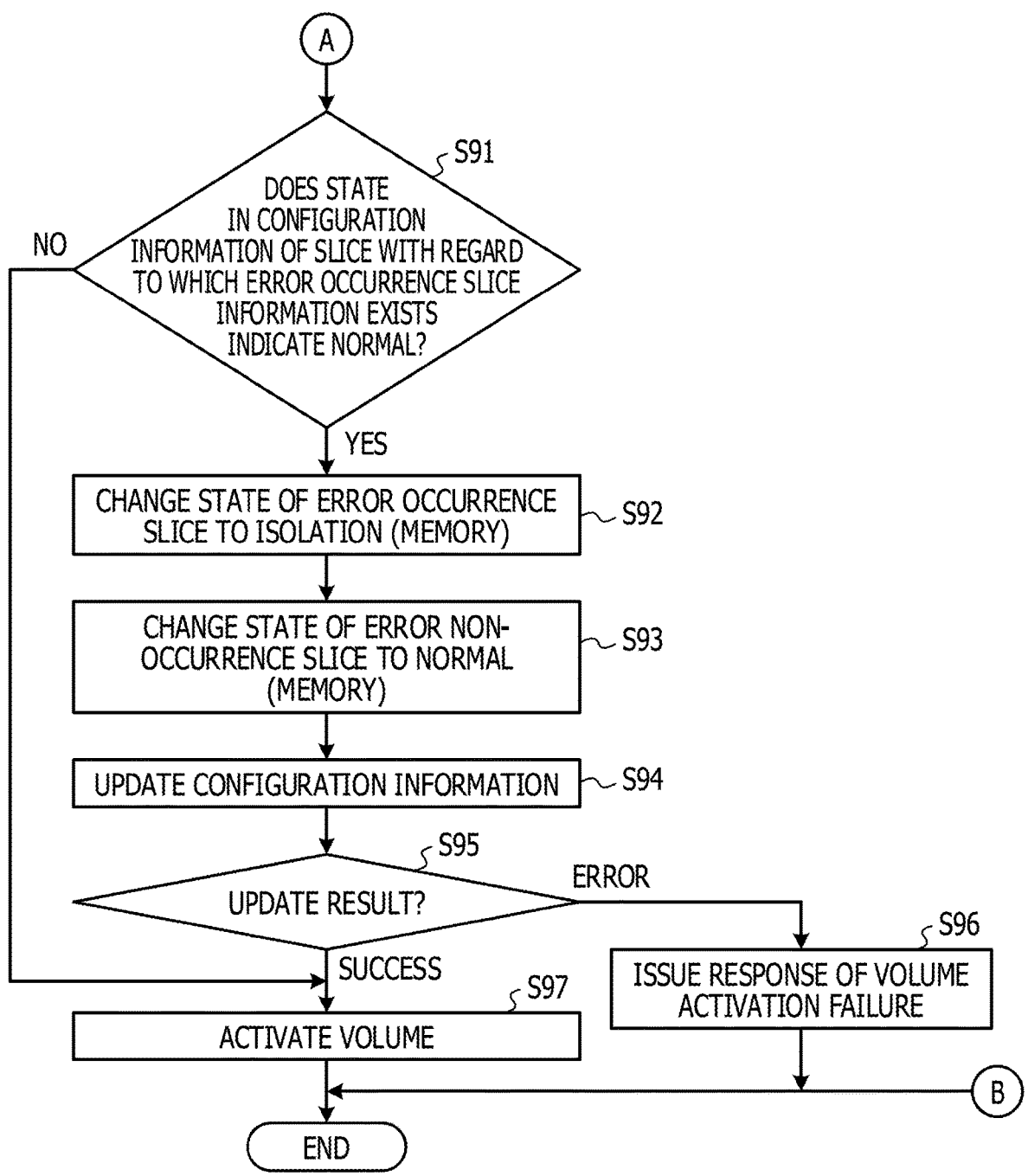

FIGS. 11A and 11B depict an example of a process upon activation of a volume. As depicted in FIGS. 11A and 11B, if the demon 33 receives a volume activation processing request (step S81), it acquires failed disk information of the own node 2 from the file (step S82). Then, the demon 33 decides an acquisition result (step S83) and issues a response of a volume activation failure in the case where the acquisition result indicates failure (step S84).

On the other hand, in the case where the demon 33 succeeds in acquisition of failed disk information of the own node 2, it acquires the failed disk information of the different node 2 from the file (step S85). The demon 33 decides an acquisition result (step S86) and issues, in the case where the acquisition result indicates failure, a response of volume activation failure (step S87).

On the other hand, in the case where the demon 33 succeeds in acquisition of failed disk information of the different node 2, it decides whether or not there is an error occurrence slice (step S88), and in the case where there is no error occurrence slice, the demon 33 activates the volume (step S89). On the other hand, in the case where there is an error occurrence slice, the demon 33 decides whether or not the error occurrence slice information exists only in one of the nodes 2 (step S90).

In the case where the error occurrence slice information exists only in one of the nodes 2, the demon 33 decides whether or not the configuration information of the slice in regard to which the error occurrence slice information exists indicates the normal state (step S91). In the case where the configuration of the slice in regard to which the error occurrence slice information exists indicates the normal state, the demon 33 changes the state of the error occurrence slice to isolation in the configuration information in the memory (step S92). The demon 33 changes the state of an error non-occurrence slice to normal in the configuration information in the memory (step S93).

The demon 33 updates the configuration information of the disk apparatus 23 (step S94) and decides an update result (step S95). In the case where the update results in failure, the demon 33 issues a response of volume activation failure (step S96), but in the case where the update results in success, the demon 33 activates the volume (step S97).

In the case where the error occurrence slice information exists in both of the nodes 2 at step S90, the demon 33 decides whether or not the error occurrence slice information coincides in both nodes 2 (step S98), and in the case where the error occurrence slice information coincides, the processing advances to step S91. On the other hand, in the case where the error occurrence slice information does not coincide in both nodes 2, the demon 33 issues a response of volume activation failure (step S99).

In this manner, the demon 33 may reflect the latest state upon the configuration information by updating the configuration information based on the failed disk information upon volume activation.

Figure 12:
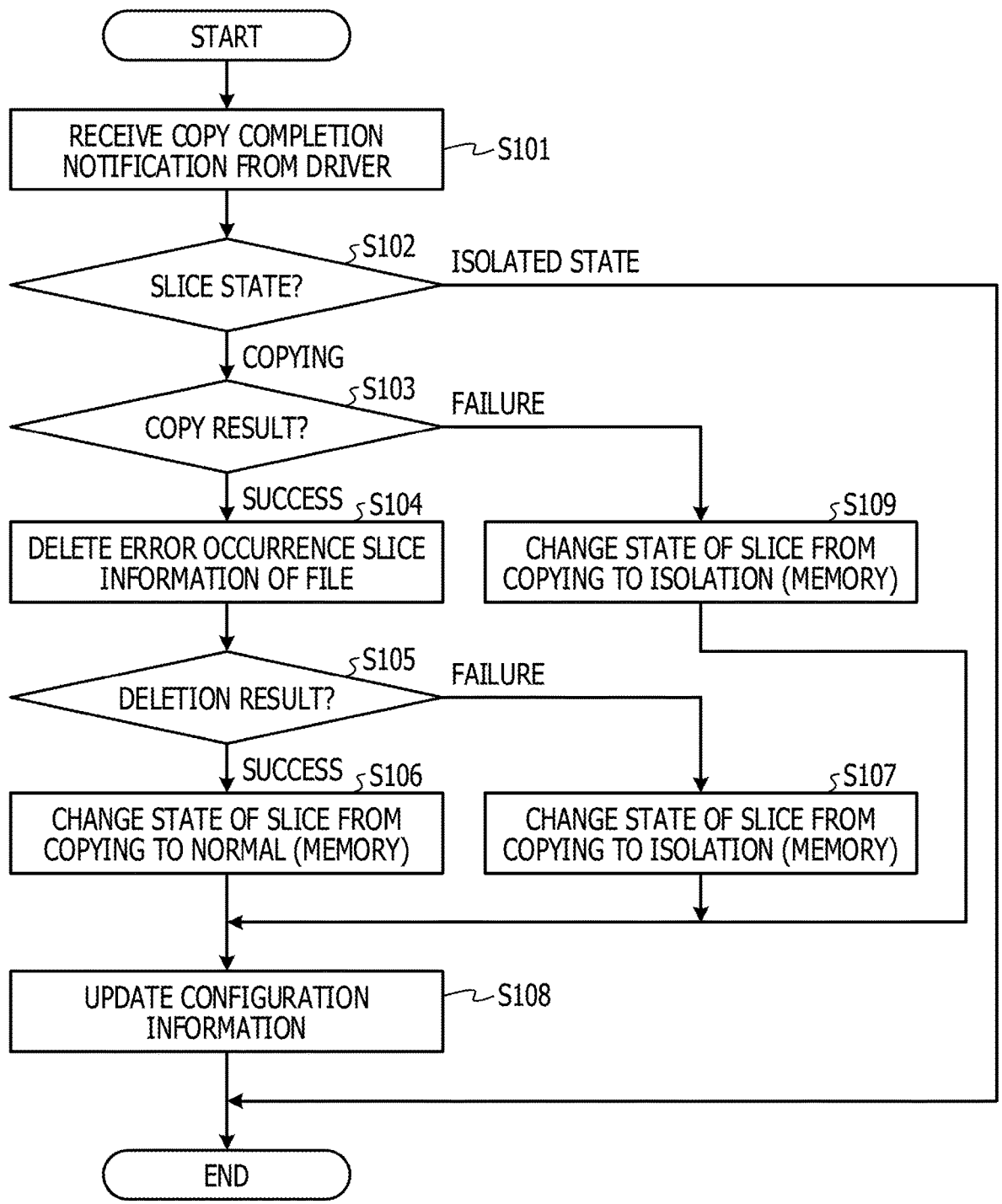
FIG. 12 depicts an example of a deletion process of failed disk information upon completion of copying.

FIG. 12 depicts an example of a deletion process of failed disk information upon completion of copying. As depicted in FIG. 12, if the demon 33 receives a copy completion notification from the driver 31 (step S101), it decides the state of a slice whose copy is completed (step S102). Then, in the case where the state of the slice is the isolation state, the demon 33 ends the processing.

On the other hand, in the case where the state of the slice whose copy is completed is the copying state, the demon 33 decides a copy result (step S103), and in the case where the copy result indicates success, the demon 33 deletes the error occurrence slice information of the file (step S104) and decides a deletion result (step S105). In the case where the deletion result indicates success, the demon 33 changes the state of the slice in the configuration information in the memory from the copying state to the normal state (step S106). On the other hand, in the case where the deletion result indicates failure, the demon 33 changes the state of the slice in the configuration information in the memory from the copying state to the isolation state (step S107). Then, the demon 33 updates the configuration information of the disk apparatus 23 (step S108).

In the case where the copy result indicates failure at step S103, the demon 33 changes the state of the slice in the configuration information in the memory from the copying state to the isolation state (step S109) and updates the configuration information of the disk apparatus 23 (step S108).

In this manner, the demon 33 may suppress failed disk information from being used in error by deleting the error occurrence slice information upon completion of copy.

As described above, if an error occurs when data is written on the remote disk, the driver 31 suspends a write process and notifies the demon 33 of occurrence of an error. Then, the demon 33 records the information of the error occurrence slice into the file and issues a response of temporary recording completion to the driver 31. The driver 31 resumes the write process and issues a response of write completion to the app 21 to perform user I/O recovery. The demon 33 performs isolation of the error occurrence slice after it records the information of the error occurrence slice into the file. Accordingly, in the case where an error occurs when data is written on the remote disk, the disk controlling unit 30 may issue a response to the app 21 and may thereby suppress interruption of the app 21.

After the information indicative of the state of the slice is stored as the configuration information into the each node 2, the demon 33 acquires a cluster lock and updates the state of the error occurrence slice in the configuration information to the isolation state. Therefore, the error occurrence slice may be isolated.

In the case where the demon 33 fails in the process for recording the information of the error occurrence slice into the file, it re-executes the process for recording the information of the error occurrence slice into the file after the isolation process. Accordingly, the demon 33 may increase the possibility in recording of the information of the error occurrence slice into the file.

In the case where, upon activation of the node 2, the different node 2 is operating normally, the copying unit 31c performs a process for establishing matching between the local disk and the remote disk using the filed disk information. Accordingly, even in the case where an error occurs when data is written on the remote disk, data whose matching state is not established may be suppressed from being used.

After matching between the local disk and the remote disk is established using the failed disk information, since the failure information deletion unit 38 deletes the failed disk information, the failed disk information may be suppressed from being utilized in error.

In the case where, upon activation of the node 2, the different node 2 is operating normally, since the activation controlling unit 37 updates the configuration information of the own node 2 and the different node 2 using the failed disk information, matching in configuration information between the own node 2 and the different node 2 may be established.

Since the failure information writing unit 35 writes a class ID, a volume ID, and a SCSI ID as the failed disk information into the file, the slice with which an error occurs may be specified based on the failed disk information.

Although the disk controlling unit 30 has been described, a disk controlling program having similar functions may be obtained by implementing the configuration the disk controlling unit 30 has by software.

Figure 13:
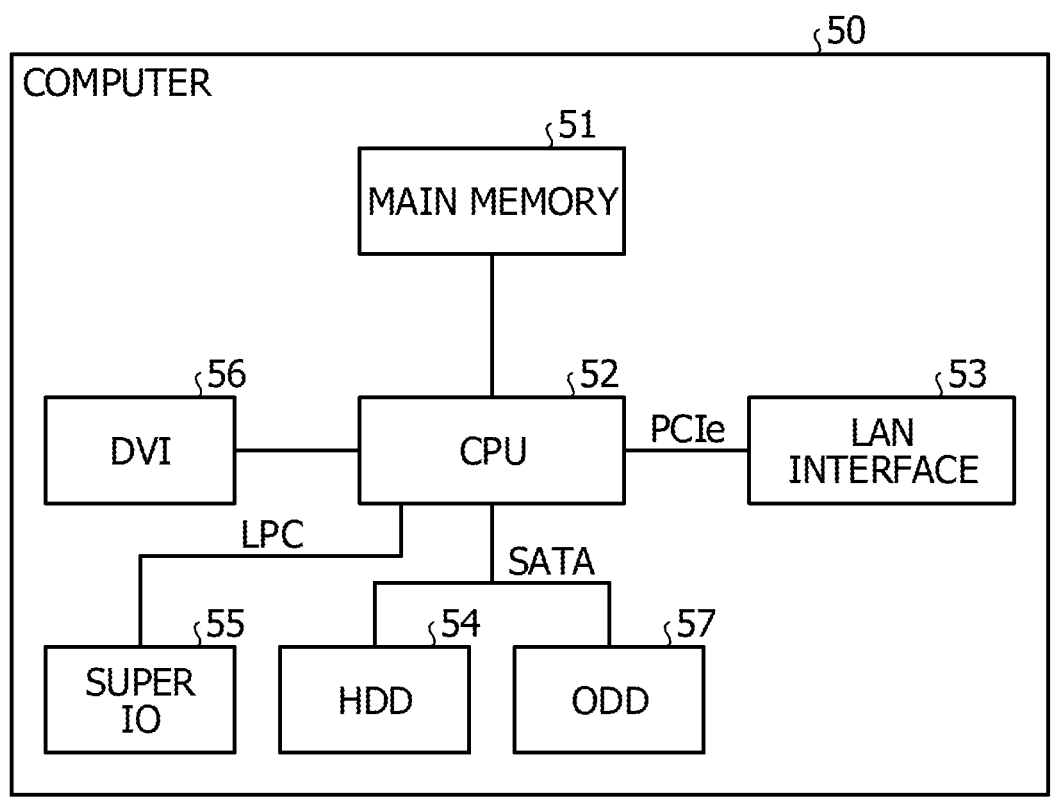
FIG. 13 depicts an example of a hardware configuration of a computer that executes a disk controlling program.

FIG. 13 depicts an example of a hardware configuration of a computer that executes a disk controlling program. As depicted in FIG. 13, the computer 50 includes a main memory 51, a central processing unit (CPU) 52, a local area network (LAN) interface 53, and a hard disk drive (HDD) 54. The computer 50 further includes a super input output (JO) 55, a digital visual interface (DVI) 56, and an optical disk drive (ODD) 57.

The main memory 51 is a memory that stores programs, execution interim results of the programs and so forth. The CPU 52 is a central processing unit that reads out a program from the main memory 51 and executes the program. The CPU 52 includes a chip set including a memory controller.

The LAN interface 53 is an interface for coupling the computer 50 to a different computer through a LAN. The HDD 54 is a disk apparatus for storing programs and data. The super IO 55 is an interface for coupling an inputting apparatus such as a mouse or a keyboard. The DVI 56 is an interface for coupling a liquid crystal display apparatus, and the ODD 57 is an apparatus that performs reading and writing for a digital versatile disc (DVD).

The LAN interface 53 is coupled to the CPU 52 by a peripheral component interconnect express (PCIe), and the HDD 54 and the ODD 57 are coupled to the CPU 52 by a serial advanced technology attachment (SATA). The super IO 55 is coupled to the CPU 52 by a low pin count (LPC).

A disk controlling program to be executed by the computer 50 is stored on a DVD that is an example of a recording medium readable by the computer 50, and is read out from the DVD by the ODD 57 and installed into the computer 50. Alternatively, the disk controlling program is stored in a database or the like of a different computer system coupled by the LAN interface 53, and is read out from the database and installed into the computer 50. The installed disk controlling program is recorded on the HDD 54, and is read out into the main memory 51 and executed by the CPU 52.

While the embodiment described above is directed to a case in which the disk apparatus 23 is used as an apparatus that stores data, the node 2 may use some other nonvolatile storage device such as a solid state drive (SSD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus, comprising:
a first nonvolatile storage device; and
a processor coupled to the first nonvolatile storage device,
the processor is configured to:
suspend, when receiving a write request of data from an application, a write process for the write request in a case where second writing of the data into a second nonvolatile storage device of a different information processing apparatus fails while first writing of the data into the first nonvolatile storage device succeeds;

record, after the write process is suspended, error information indicative of an error of the second writing;

resume, after the error information is recorded, the write process and issue a notification of the application of completion of the write process;

isolate, after the notification of the completion of the write process is issued, a region of the second nonvolatile storage device which is used by the application;

store information indicative of whether each region that is to be used by the application is in an isolated state as configuration information;

acquire a lock to be used for exclusive control with the different information processing apparatus;

update a location of the configuration information corresponding to the region at which the error occurs to information indicating that the location is in the isolated state;

determine, at the time of activation of the information processing apparatus, whether an operation of the different processing apparatus is normal; and update, when determining that the operation of the different processing apparatus is normal at the time of activation of the information processing apparatus, the configuration information of the information processing apparatus and the different information processing apparatus based on the error information.

2. The information processing apparatus according to claim 1, wherein the processor is configured to delete the error information after acquiring the consistency in the data between the first nonvolatile storage device and the second nonvolatile storage device.

3. The information processing apparatus according to claim 1, wherein the processor is configured to try, in a case where the recording of the error information results in failure, recording of the error information again after the configuration information is updated.

4. The information processing apparatus according to claim 1, wherein the processor is configured to record, as the error information, a class identifier for the identification of a set of the first nonvolatile storage device and the second nonvolatile storage device, a volume identifier for the identification of a region which is used by the application, and a small computer system interface identifier for the identification between the first nonvolatile storage device and the second nonvolatile storage device.

5. The information processing apparatus according to claim 1, wherein the processor is configured to:

acquire, in a case where an operation of the different information processing apparatus is normal at a time of activation of the information processing apparatus, consistency in data by a copy process of the data between the first nonvolatile storage device and the second nonvolatile storage device based on the error information; and change a state of the different information processing apparatus to a normal state.

6. An information processing system, comprising:
a first information processing apparatus including a first nonvolatile storage device; and
a second information processing apparatus including a second nonvolatile storage device,
the first information processing apparatus is configured to:

suspend, when receiving a write request of data from an application, a write process for the write request in a case where second writing of the data into a second nonvolatile storage device of a different information processing apparatus fails while first writing of the data into the first nonvolatile storage device succeeds;

record, after the write process is suspended, error information indicative of an error of the second writing;

resume, after the error information is recorded, the write process and issue a notification of the application of completion of the write process;

isolate, after the notification of the completion of the write process is issued, a region of the second nonvolatile storage device which is used by the application;

store information indicative of whether each region that is to be used by the application is in an isolated state as configuration information;

acquire a lock to be used for exclusive control with the different information processing apparatus;

update a location of the configuration information corresponding to the region at which the error occurs to information indicating that the location is in the isolated state;

determine, at the time of activation of the information processing apparatus, whether an operation of the different processing apparatus is normal; and update, when determining that the operation of the different processing apparatus is normal at the time of activation of the information processing apparatus, the configuration information of the information processing apparatus and the different information processing apparatus based on the error information.

7. The information processing system according to claim 6, wherein the first information processing apparatus is configured to delete the error information after acquiring the consistency in data between the first nonvolatile storage device and the second nonvolatile storage device.

8. The information processing system according to claim 6, wherein the first information processing apparatus is configured to try, in a case where the recording of the error information results in failure, recording of the error information again after the configuration information is updated.

9. The information processing system according to claim 6, wherein the first information processing apparatus is configured to record, as the error information, a class identifier for the identification of a set of the first nonvolatile storage device and the second nonvolatile storage device, a volume identifier for the identification of a region which is used by the application, and a small computer system interface identifier for the identification between the first nonvolatile storage device and the second nonvolatile storage device.

10. The information processing system according to claim 6, wherein the first information processing apparatus is configured to:

acquire, in a case where an operation of the different information processing apparatus is normal at a time of activation of the information processing apparatus, consistency in data by a copy process of the data between the first nonvolatile storage device and the second nonvolatile storage device based on the error information; and change a state of the different information processing apparatus to a normal state.

11. A non-transitory computer-readable recording medium recording a program which causes a computer to execute a process, the process comprising:
  suspending, when receiving a write request of data from an application, a write process for the write request in a case where second writing of the data into a second nonvolatile storage device of a different information processing apparatus fails while first writing of the data into a first nonvolatile storage device of an information processing apparatus succeeds;
  recording, after the write process is suspended, error information indicative of an error of the second writing;
  resuming, after the error information is recorded, the write process and issue a notification of the application of completion of the write process;
  isolating, after the notification of the completion of the write process is issued, a region of the second nonvolatile storage device which is used by the application;
  storing information indicative of whether each region that is to be used by the application is in an isolated state as configuration information;
  acquiring a lock to be used for exclusive control with the different information processing apparatus;
  updating a location of the configuration information corresponding to the region at which the error occurs to information indicating that the location is in the isolated state;
  determining, at the time of activation of the information processing apparatus, whether an operation of the different processing apparatus is normal; and
  updating, when determining that the operation of the different processing apparatus is normal at the time of activation of the information processing apparatus, the configuration information of the information processing apparatus and the different information processing apparatus based on the error information.

12. The non-transitory computer-readable recording medium according to claim 11, further comprising deleting the error information after acquiring the consistency in data between the first nonvolatile storage device and the second nonvolatile storage device.

13. The non-transitory computer-readable recording medium according to claim 11, further comprising recording, as the error information, a class identifier for the identification of a set of the first nonvolatile storage device and the second nonvolatile storage device, a volume identifier for the identification of a region which is used by the application, and a small computer system interface identifier for the identification between the first nonvolatile storage device and the second nonvolatile storage device.

14. The non-transitory computer-readable recording medium according to claim 11, further comprising:
  acquiring, in a case where an operation of the different information processing apparatus is normal at a time of activation of the information processing apparatus, consistency in data by a copy process of the data between the first nonvolatile storage device and the second nonvolatile storage device based on the error information; and
  changing a state of the different information processing apparatus to a normal state.

* * * * *